US012646787B2

(12) United States Patent
Patel et al.

(10) Patent No.: US 12,646,787 B2
(45) Date of Patent: Jun. 2, 2026

(54) INTERFACE FOR INTEGRATING A CURRENT COLLECTOR INTO A BATTERY ASSEMBLY

(71) Applicant: Rivian IP Holdings, LLC, Plymouth, MI (US)

(72) Inventors: Neil Patel, Costa Mesa, CA (US); Tyler Jacobs, Redondo Beach, CA (US); James Daisuke Spence, Ontario, CA (US); Leonel Caballero Banuelos, Orange, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 793 days.

(21) Appl. No.: 18/067,769

(22) Filed: Dec. 19, 2022

(65) Prior Publication Data

US 2024/0204332 A1     Jun. 20, 2024

(51) Int. Cl.
*H01M 50/262*          (2021.01)
*H01M 50/503*          (2021.01)

(52) U.S. Cl.
CPC ....... *H01M 50/262* (2021.01); *H01M 50/503* (2021.01)

(58) Field of Classification Search
CPC .................................................. H01M 50/503
See application file for complete search history.

(56) References Cited

U.S. PATENT DOCUMENTS

| | | |
|---|---|---|
| 9,147,875 B1 | 9/2015 | Coakley et al. |
| 9,545,010 B2 | 1/2017 | Coakley et al. |
| 9,844,148 B2 | 12/2017 | Coakley et al. |
| 10,211,443 B2 | 2/2019 | Coakley et al. |
| 10,964,931 B2 | 3/2021 | Coakley et al. |
| 11,116,070 B2 | 9/2021 | Coakley et al. |
| 11,894,580 B2 | 2/2024 | Coakley et al. |
| 11,979,976 B2 | 5/2024 | Coakley et al. |
| 12,035,459 B2 | 7/2024 | Coakley et al. |
| 12,040,511 B2 | 7/2024 | Coakley et al. |
| 2013/0337291 A1 | 12/2013 | Mayer et al. |
| 2015/0207127 A1* | 7/2015 | Davis .................. H01M 10/482 429/90 |
| 2015/0325824 A1* | 11/2015 | Hasegawa ............. H01M 50/30 429/151 |
| 2018/0190960 A1* | 7/2018 | Harris ................... H01M 50/20 |
| 2019/0081370 A1 | 3/2019 | Capati et al. |
| 2020/0152936 A1 | 5/2020 | Wynn et al. |

(Continued)

OTHER PUBLICATIONS

Non-Final Office Action on U.S. Appl. No. 18/067,771, dated Apr. 6, 2023, 9 pgs.

(Continued)

*Primary Examiner* — Maria Laios

(74) *Attorney, Agent, or Firm* — Foley & Lardner LLP

(57) ABSTRACT

An interface for aligning a current collector with a tote in a battery system is provided. A pin can be located on one of the current collector or the tote. A receptacle can be located on one of the current collector or the tote. The receptacle can include an opening having a first size in a first direction that is greater than or equal to a second size of the opening in a second direction. The opening can be configured to align the current collector with the tote via the pin inserted into the receptacle.

20 Claims, 17 Drawing Sheets

(56) References Cited

U.S. PATENT DOCUMENTS

2020/0350633 A1* 11/2020 Busacca .................. H01M 4/38
2021/0175588 A1    6/2021 Coakley et al.

OTHER PUBLICATIONS

Final Office Action on U.S. Appl. No. 18/067,771 dated Jul. 11, 2023.
Non-Final Office Action on U.S. Appl. No. 18/067,771 dated Apr. 6, 2023.
Non-Final Office Action on U.S. Appl. No. 18/067,771 dated Nov. 15, 2023.
Notice of Allowance on U.S. Appl. No. 18/067,771 dated Mar. 18, 2024.

* cited by examiner

300

Battery Module 115

Negative Current Collector 305

Tote 325

Tote 325

Positive Current Collector 405

Battery Module 115

Current Collector 305 / 405

Contact layer 610

Bar layer 615

Cover layer 605

Receptacle 620

Opening 625

Width direction 745

Receptacle 620 / Opening 625

Width size 635

Length direction 740

Length size 630

Current Collector End 505 / Current Collector Corner 510

Pin 720

Battery cells 120

Weld 730

Weld Window 715

Tab 705

Cutout 710

Cover layer 605

Pins 720 / Receptacles 620

Tote 325

Battery Cells 120

Pins 720 / Receptacles 620

Current Collector 305 / 405

Contact end 1005    Tab 705

Connection end 1010

Contact layer 610

Bar layer 615

Battery Cells 120

Cutout 710

Current Collector 305 / 405

Battery Module 115

Tote 325

Cutout 710

Contact layer 610

Bar layer 615

Cover Layer 605

Weld 730

Weld Opening 715

Pin 720

Receptacle 620 / Opening 625

1200

1300

```
┌──────────────────────────────────────────────┐
│                                                │
│           Provide a battery module             │──── 1305
│                                                │
└──────────────────────────────────────────────┘
```

FIG. 13

INTERFACE FOR INTEGRATING A CURRENT COLLECTOR INTO A BATTERY ASSEMBLY

INTRODUCTION

Electric vehicles (EVs) can be powered using batteries that store energy to reduce greenhouse gas emissions. The batteries can include different components facilitating energy storage and distribution.

SUMMARY

This disclosure is generally directed to a solution for providing an interface alignment and access features for efficient integration of a current collector with a battery assembly in an electric vehicle (EV). An EV can be powered from a battery system having any combination of battery packs, battery modules or battery cells. The battery cells can charge or discharge their power via current collectors. However, integration of a current collector into a battery assembly during the manufacturing process can be difficult and time consuming. The present disclosure provides physical alignment solutions that can be used for efficiently integrating a current collector with a tote of a battery, simplifying the battery manufacturing process. The present solution also provides access features for the current collectors to allow for efficient welding of internal current collector layers, improving both the manufacturing process and the battery performance. The resulting design can use pairs of pins and receptacles for aligning the current collectors with a tote of the battery. The resulting design can also provide weld windows as access for internal welding of the current collector layers, as well as cutouts in the current collectors for aligning tabs of the current collectors with battery cells of the battery. These technical features can allow for a more efficient and simple manufacturing of an improved EV battery.

At least one aspect can be directed to a battery system. The battery system can include receptacle having an opening. A length of the opening can be different from a width of the opening. The battery system can include pin configured to align a tote with a current collector via placement of the pin in the opening of the receptacle.

At least one aspect can be directed to a battery module. The battery module can include a current collector of a battery module and a tote of the battery module. A pin can be located on one of the current collector or the tote. A receptacle can be located on one of the current collector or the tote. The receptacle can include an opening having a first size in a first direction that is greater than or equal to a second size of the opening in a second direction. The opening can be configured to align the current collector with the tote via the pin inserted into the receptacle.

A method can include providing a battery system. The battery system can include a receptacle having an opening. A length of the opening can be different from a width of the opening. The battery system can include a pin configured to align a tote with a current collector via placement of the pin in the opening of the receptacle.

At least one aspect is directed to a method. The method can include supporting a current collector of a battery module by a tote of the battery module. The method can include forming a pin on one of the current collector or the tote. The method can include forming, on one of the current collector or the tote, a receptacle. The receptacle can include an opening having a first size in a first direction that is greater than or equal to a second size of the opening in a second direction. The method can include aligning the current collector with the tote in at least the first direction or the second direction via the pin inserted into the receptacle.

At least one aspect is directed to a method. The method can include providing a battery module. The battery module can include a current collector of a battery module. The battery module can include a tote of the battery module to provide support for the current collector. The battery module can include a pin located on one of the current collector or the tote. The battery module can include a receptacle located on one of the current collector or the tote. The receptacle can include an opening having a first size in a first direction that is greater than or equal to a second size of the opening in a second direction to align the current collector with the tote in at least the first direction or the second direction via the pin inserted into the receptacle.

At least one aspect is directed to an electric vehicle. The electric vehicle can include a battery system. The battery system can include a receptacle having an opening. A length of the opening can be different from a width of the opening. The battery system can include a pin configured to align a tote with a current collector via placement of the pin in the opening of the receptacle.

At least an aspect is directed to an electric vehicle comprising a battery module. The battery module can include a current collector of a battery module and a tote of the battery module. The battery module can include a pin that can be located on one of the current collector or the tote. The battery module can include a receptacle that can be located on one of the current collector or the tote. The receptacle can include an opening having a first size in a first direction that is greater than or equal to a second size of the opening in a second direction. The opening can be configured to align the current collector with the tote via the pin inserted into the receptacle.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 13 is a flow diagram illustrating an example method of providing a battery module.

DETAILED DESCRIPTION

Following below are more detailed descriptions of various concepts related to, and implementations of, methods, apparatuses, and systems of integrating a current collector into a battery module assembly of an electric vehicle. The various concepts introduced above and discussed in greater detail below may be implemented in any of numerous ways.

This disclosure is generally directed to a solution for providing interfacing alignment and access features for efficient manufacturing and integration of a current collector with a battery assembly of an EV, such as an assembly of a battery pack or a battery module. An EV can store energy in a battery pack that can include interconnected battery modules. The battery pack or the battery modules can include battery cells which can be charged and discharged via current collectors of the battery modules. However, manufacturing and integrating current collectors into a battery assembly can be difficult and time consuming. For example, it can be challenging to integrate a current collector with a tote of a battery pack or a battery module in a finite enclosure without introducing inefficiencies or negatively impacting performance of other components in the battery. It can be difficult to efficiently integrate contact tabs of the current collectors with the battery cells of the battery introducing misalignments or stressing the tabs. It can be difficult to allow for welding of the internal current collector layers during the fabrication process.

The present solution can provide physical alignment and access features for efficiently integrating a current collector with a battery assembly. The present solution can provide for aligning of current collector tabs with internal battery cells so as to reduce the stress of the tabs, or allow for welding of internal layers of the current collector during a battery pack or a battery module integration. The resulting solution can provide one or more pairs of pins and receptacles for aligning a current collector with a tote of the battery pack or the battery module. The receptacles can include openings to align the current collector with the tote when the pins are inserted into the openings of the receptacles. The current collector can include cutouts around tabs of the current collector for electrically contacting the battery cells and both relieve the stress of the tabs of the contact layer of the current collector and allow for alignment of the current collector tabs with the battery cells. The current collector can also include weld windows located around the tabs for allowing for internal welding of different metal layers of the current collector during the manufacturing process. The technical features of the present solution can allow for a more efficient and simple integration of the current collector into the battery of the electric vehicle.

Figure 1:
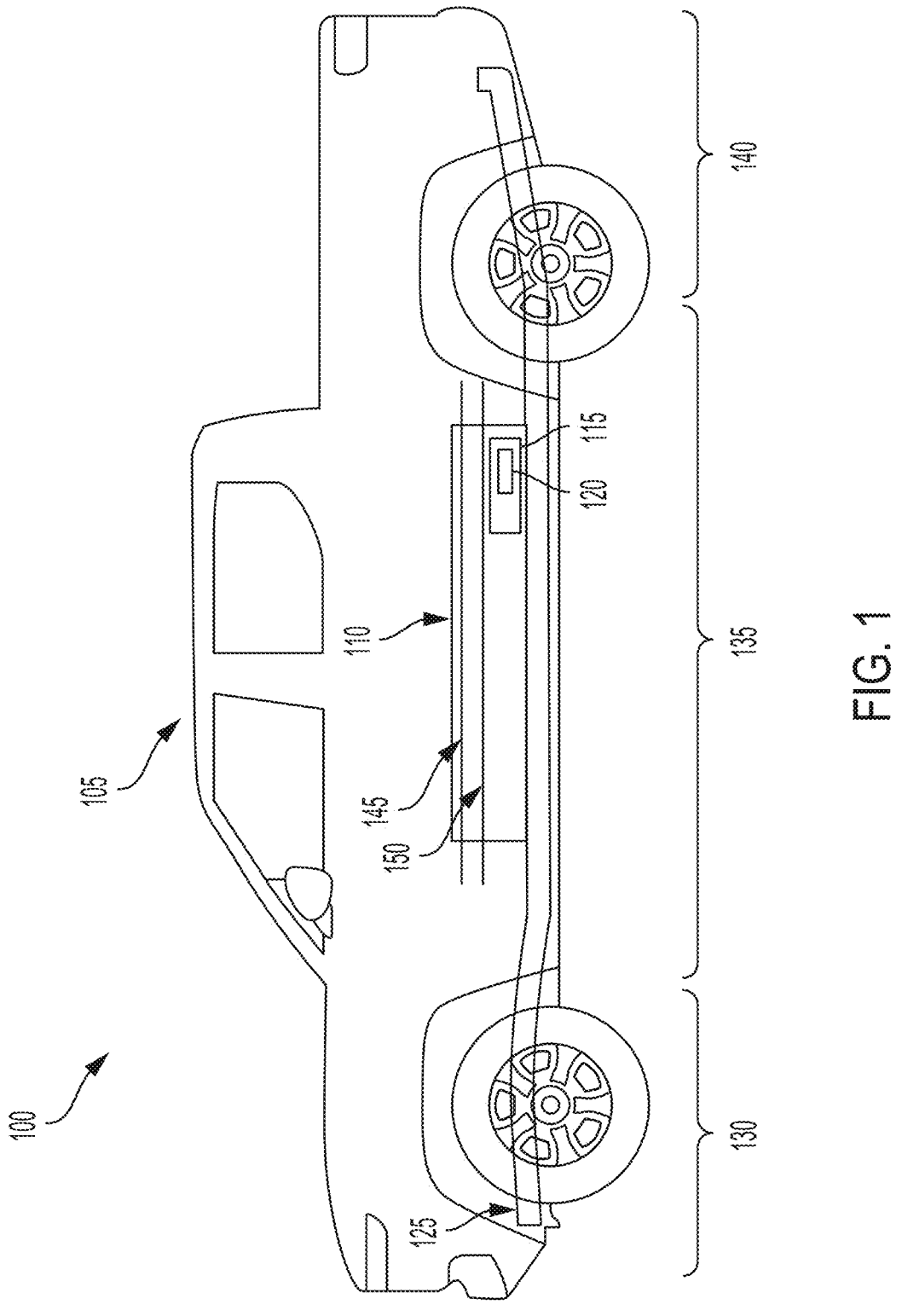
FIG. 1 depicts an example electric vehicle.

FIG. 1 depicts an example cross-sectional view 100 of an electric vehicle 105 installed with at least one battery pack 110. Electric vehicles 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 110 can also be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. Electric vehicles 105 can also be human operated or non-autonomous. Electric vehicles 105 such as electric trucks or automobiles can include on-board battery packs 110, battery modules 115, or battery cells 120 to power the electric vehicles. The electric vehicle 105 can include a chassis 125 (e.g., a frame, internal frame, or support structure). The chassis 125 can support various components of the electric vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the electric vehicle 105. For example, the battery pack 110 can be installed on the chassis 125 of the electric vehicle 105 within one or more of the front portion 130, the body portion 135, or the rear portion 140. The battery pack 110 can include or connect with at least one busbar, e.g., a current collector element. For example, the first busbar 145 and the second busbar 150 can include electrically conductive material to connect or otherwise electrically couple the battery modules 115 or the battery cells 120 with other electrical components of the electric vehicle 105 to provide electrical power to various systems or components of the electric vehicle 105.

Figure 2A:
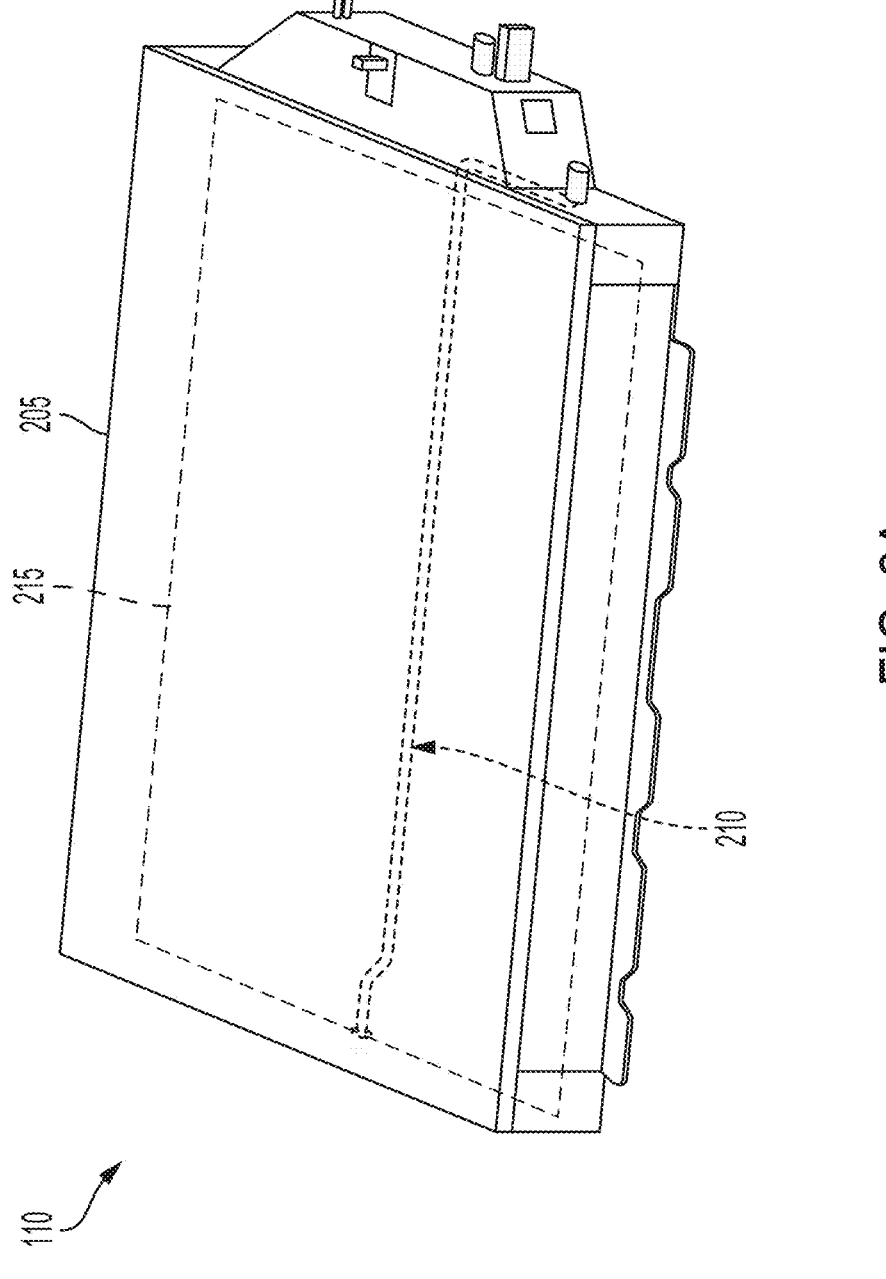
FIG. 2A depicts an example of one or more battery packs.

FIG. 2A depicts an example battery pack 110. Referring to FIG. 2A, among others, the battery pack 110 can provide power to electric vehicle 105. Battery packs 110 can include any arrangement or network of electrical, electronic, mechanical or electromechanical devices to power a vehicle of any type, such as the electric vehicle 105. The battery pack 110 can include at least one housing 205. The housing 205 can include at least one battery module 115 or at least one battery cell 120, as well as other battery pack components. The battery module 115 can be or can include one or more groups of prismatic cells, cylindrical cells, pouch cells, or other form factors of battery cells 120. The housing 205 can include a shield on the bottom or underneath the battery module 115 to protect the battery module 115 and/or cells 120 from external conditions, for example if the electric vehicle 105 is driven over rough terrains (e.g., off-road, trenches, rocks, etc.) The battery pack 110 can include at least one cooling line 210 that can distribute fluid through the battery pack 110 as part of a thermal/temperature control or heat exchange system that can also include at least one thermal component (e.g., cold plate) 215. The thermal component 215 can be positioned in relation to a top submodule and a bottom submodule, such as in between the top and bottom submodules, among other possibilities. The battery pack 110 can include any number of thermal components 215. For example, there can be one or more thermal components 215 per battery pack 110, or per battery module 115. At least one cooling line 210 can be coupled with, part of, or independent from the thermal component 215.

Figure 2B:
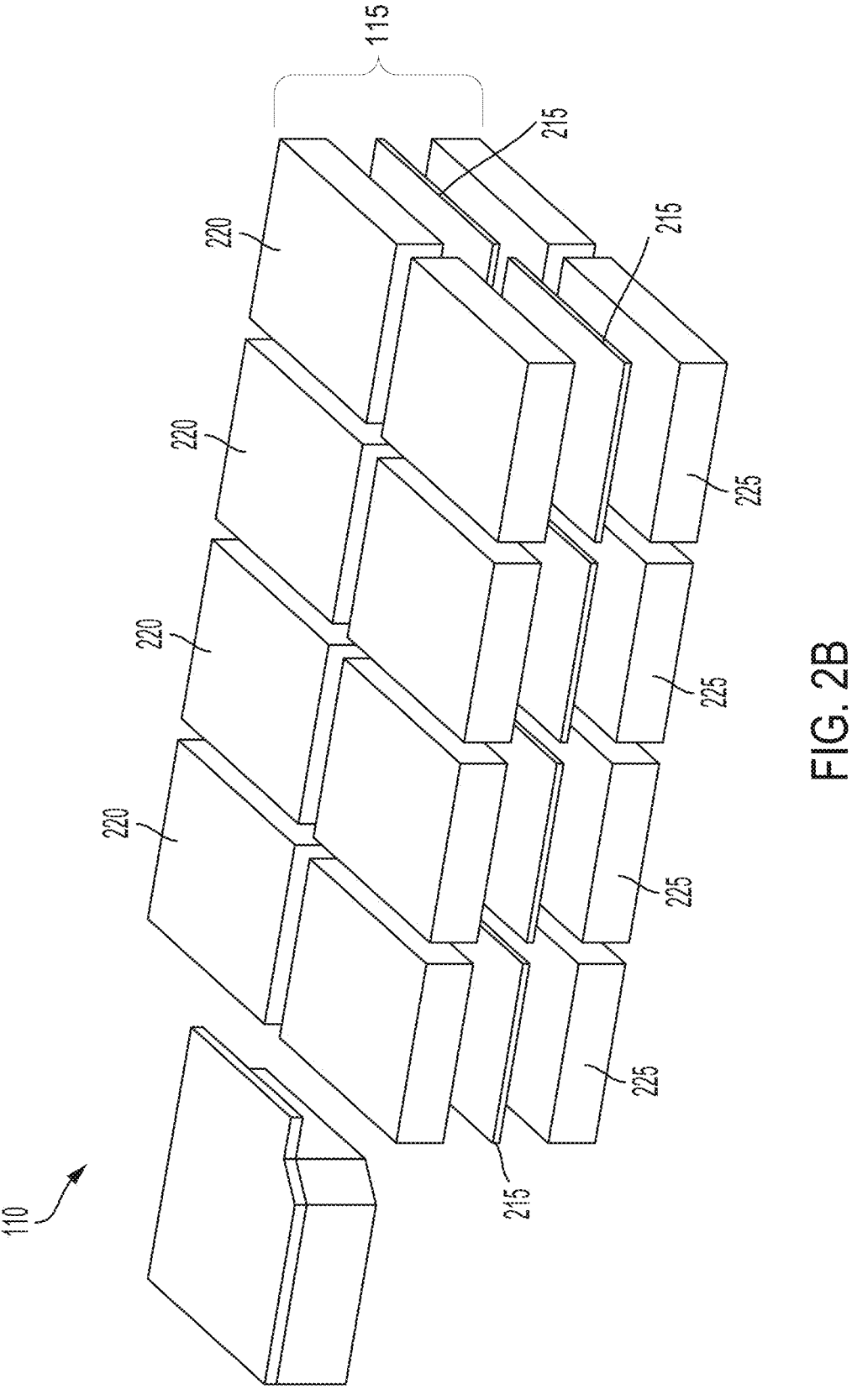
FIG. 2B depicts an example of one or more battery modules.
Figure 2C:
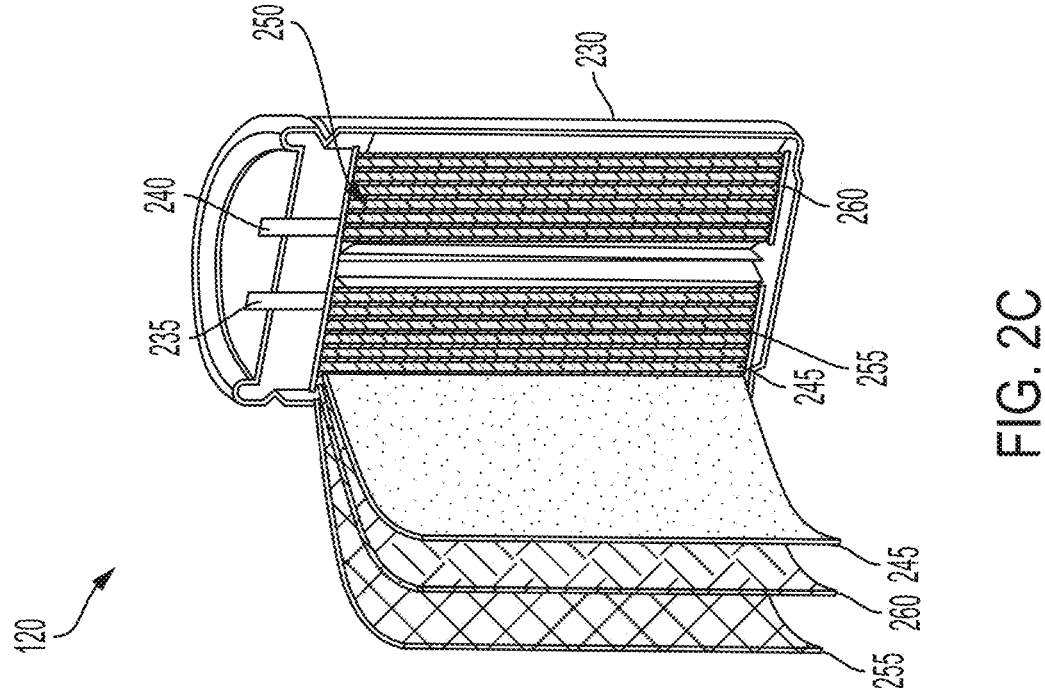
FIG. 2C depicts a cross sectional view of a battery cell.

FIG. 2B depicts example battery modules 115, and FIG. 2C. 2D and 2E depict an example cross sectional view of a battery cell 120. The battery modules 115 can include at least one submodule. For example, the battery modules 115 can include at least one first (e.g., top) submodule 220 or at least one second (e.g., bottom) submodule 225. At least one thermal component 215 can be disposed between the top submodule 220 and the bottom submodule 225. For example, one thermal component 215 can be configured for heat exchange with one battery module 115. The thermal component 215 can be disposed or thermally coupled between the top submodule 220 and the bottom submodule 225. One thermal component 215 can also be thermally coupled with more than one battery module 115 (or more than two submodules 220, 225). The battery submodules 220, 225 can collectively form one battery module 115. In some examples each submodule 220, 225 can be considered as a complete battery module 115, rather than a submodule.

The battery modules 115 can each include a plurality of battery cells 120. The battery modules 115 can be disposed within the housing 205 of the battery pack 110. The battery modules 115 can include battery cells 120 that are cylindrical cells or prismatic cells, for example. The battery module 115 can operate as a modular unit of battery cells 120. For example, a battery module 115 can collect current or electrical power from the battery cells 120 that are included in the battery module 115 and can provide the current or electrical power as output from the battery pack 110. The battery pack 110 can include any number of battery modules 115. For example, the battery pack can have one, two, three, four, five, six, seven, eight, nine, ten, eleven, twelve or other number of battery modules 115 disposed in the housing 205. It should also be noted that each battery module 115 may include a top submodule 220 and a bottom submodule 225, possibly with a thermal component 215 in between the top submodule 220 and the bottom submodule 225. The battery pack 110 can include or define a plurality of areas for positioning of the battery module 115 and/or cells 120. The battery modules 115 can be square, rectangular, circular, triangular, symmetrical, or asymmetrical. In some examples, battery modules 115 may be different shapes, such that some battery modules 115 are rectangular but other battery modules 115 are square shaped, among other possibilities. The battery module 115 can include or define a plurality of slots, holders, or containers for a plurality of battery cells 120.

Figure 2D:
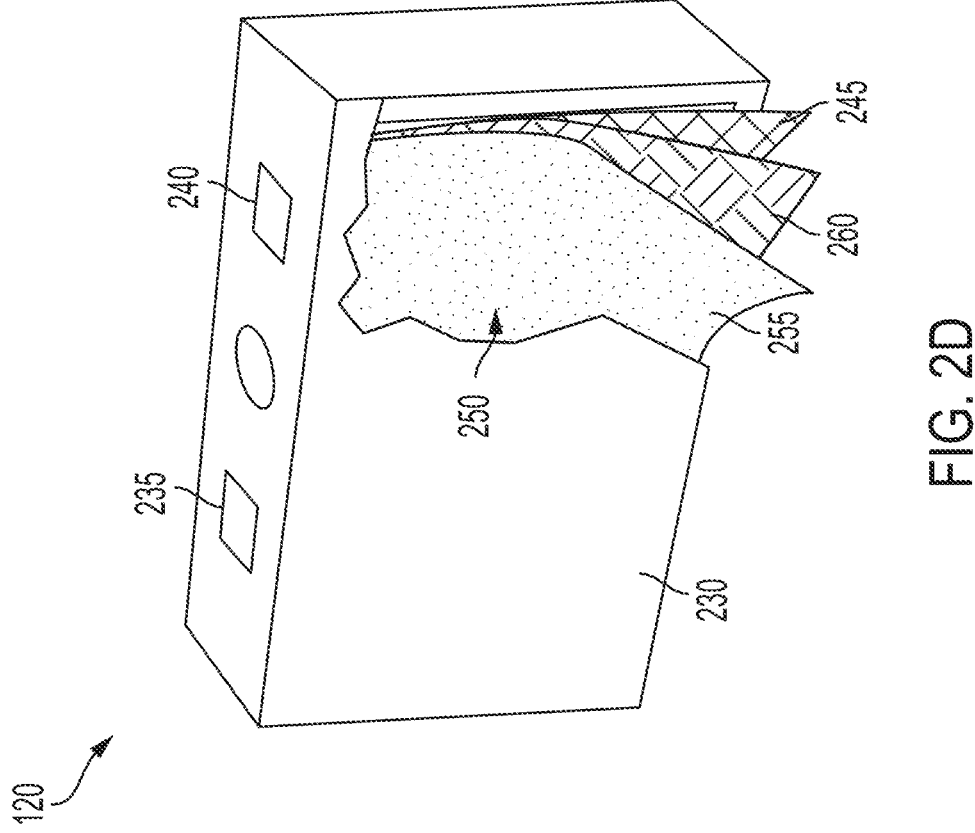
FIG. 2D depicts a cross sectional view of a battery cell.
Figure 2E:
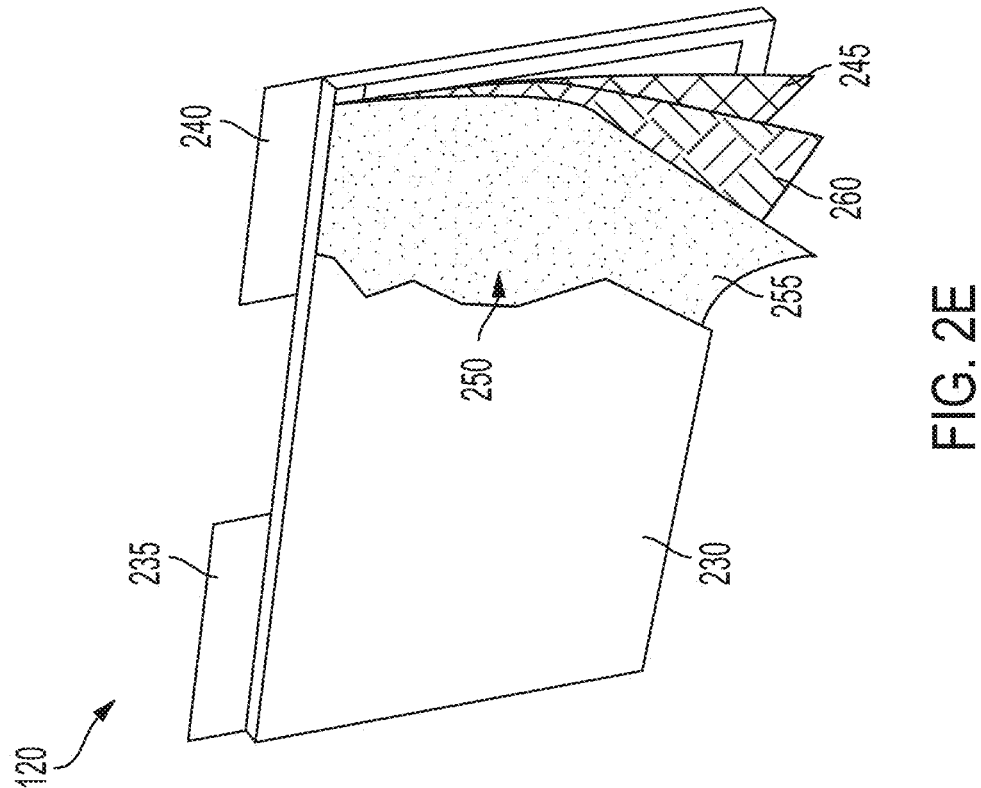
FIG. 2E depicts a cross sectional view of a battery cell.

Battery cells 120 have a variety of form factors, shapes, or sizes. For example, battery cells 120 can have a cylindrical, rectangular, square, cubic, flat, pouch, elongated or prismatic form factor. As depicted in FIG. 2C, for example, the battery cell 120 can be cylindrical. As depicted in FIG. 2D, for example, the battery cell 120 can be prismatic. As depicted in FIG. 2E, for example, the battery cell 120 can include a pouch form factor. Battery cells 120 can be assembled, for example, by inserting a winded or stacked electrode roll (e.g., a jelly roll) including electrolyte material into at least one battery cell housing 230. The electrolyte material, e.g., an ionically conductive fluid or other material, can support electrochemical reactions at the electrodes to generate, store, or provide electric power for the battery cell by allowing for the conduction of ions between a positive electrode and a negative electrode. The battery cell 120 can include an electrolyte layer where the electrolyte layer can be or include solid electrolyte material that can conduct ions. For example, the solid electrolyte layer can conduct ions without receiving a separate liquid electrolyte material. The electrolyte material, e.g., an ionically conductive fluid or other material, can support conduction of ions between electrodes to generate or provide electric power for the battery cell 120. The housing 230 can be of various shapes, including cylindrical or rectangular, for example. Electrical connections can be made between the electrolyte material and components of the battery cell 120. For example, electrical connections to the electrodes with at least some of the electrolyte material can be formed at two points or areas of the battery cell 120, for example to form a first polarity terminal 235 (e.g., a positive or anode terminal) and a second polarity terminal 240 (e.g., a negative or cathode terminal). The polarity terminals can be made from electrically conductive materials to carry electrical current from the battery cell 120 to an electrical load, such as a component or system of the electric vehicle 105.

For example, the battery cell 120 can include at least one lithium-ion battery cell. In lithium-ion battery cells, lithium ions can transfer between a positive electrode and a negative electrode during charging and discharging of the battery cell. For example, the battery cell anode can include lithium or graphite, and the battery cell cathode can include a lithium-based oxide material. The electrolyte material can be disposed in the battery cell 120 to separate the anode and cathode from each other and to facilitate transfer of lithium ions between the anode and cathode. It should be noted that battery cell 120 can also take the form of a solid state battery cell developed using solid electrodes and solid electrolytes. Solid electrodes or electrolytes can be or include inorganic solid electrolyte materials (e.g., oxides, sulfides, phosphides, ceramics), solid polymer electrolyte materials, hybrid solid state electrolytes, or combinations thereof. In some embodiments, the solid electrolyte layer can include polyanionic or oxide-based electrolyte material (e.g., Lithium Superionic Conductors (LISICONs), Sodium Superionic Conductors (NASICONs), perovskites with formula $ABO_3$ (A=Li, Ca, Sr, La, and B=Al, Ti), garnet-type with formula $A_3B_2(XO_4)_3$ (A=Ca, Sr, Ba and X=Nb, Ta), lithium phosphorous oxynitride (LixPOyNz). In some embodiments, the solid electrolyte layer can include a glassy, ceramic and/or crystalline sulfide-based electrolyte (e.g., $Li_3PS_4$, $LizP_3S_{11}$, $Li_2S$—$P_2S_5$, $Li_2S$—$B_2S_3$, $SnS$—$P_2S_5$, $Li_2S$—$SiS_2$, $Li_2S$—$P_2S_5$, $Li_2S$—$GeS_2$, $Li_{10}GeP_2S_{12}$) and/or sulfide-based lithium argyrodites with formula $Li_6PS_5X$ (X=Cl, Br) like $Li_6PS_5Cl$). Furthermore, the solid electrolyte layer can include a polymer electrolyte material (e.g., a hybrid or pseudo-solid state electrolyte), for example, polyacrylonitrile (PAN), polyethylene oxide (PEO), polymethyl-methacrylate (PMMA), and polyvinylidene fluoride (PVDF), among others.

The battery cell 120 can be included in battery modules 115 or battery packs 110 to power components of the electric vehicle 105. The battery cell housing 230 can be disposed in the battery module 115, the battery pack 110, or a battery array installed in the electric vehicle 105. The housing 230 can be of any shape, such as cylindrical with a circular (e.g., as depicted in FIG. 2C, among others), elliptical, or ovular base, among others. The shape of the housing 230 can also be prismatic with a polygonal base, as shown in FIG. 2D, among others. As shown in FIG. 2E, among others, the housing 230 can include a pouch form factor. The housing 230 can include other form factors, such as a triangle, a square, a rectangle, a pentagon, and a hexagon, among others. In some embodiments, the battery pack may not include modules. For example, the battery pack can have a cell-to-pack configuration wherein battery cells are arranged directly into a battery pack without assembly into a module.

The housing 230 of the battery cell 120 can include one or more materials with various electrical conductivity or thermal conductivity, or a combination thereof. The electrically conductive and thermally conductive material for the housing 230 of the battery cell 120 can include a metallic material, such as aluminum, an aluminum alloy with copper, silicon, tin, magnesium, manganese, or zinc (e.g., aluminum 1000, 4000, or 5000 series), iron, an iron-carbon alloy (e.g., steel), silver, nickel, copper, and a copper alloy, among others. The electrically insulative and thermally conductive material for the housing 230 of the battery cell 120 can include a ceramic material (e.g., silicon nitride, silicon carbide, titanium carbide, zirconium dioxide, beryllium oxide, and among others) and a thermoplastic material (e.g., polyethylene, polypropylene, polystyrene, polyvinyl chloride, or nylon), among others. In examples where the housing 230 of the battery cell 120 is prismatic (e.g., as depicted in FIG. 2D, among others) or cylindrical (e.g., as depicted in FIG. 2C, among others), the housing 230 can include a rigid or semi-rigid material such that the housing 230 is rigid or semi-rigid (e.g., not easily deformed or manipulated into another shape or form factor). In examples where the housing 230 includes a pouch form factor (e.g., as depicted in FIG. 2E, among others), the housing 230 can include a flexible, malleable, or non-rigid material such that the housing 230 can be bent, deformed, manipulated into another form factor or shape.

The battery cell 120 can include at least one anode layer 245, which can be disposed within the cavity 250 defined by the housing 230. The anode layer 245 can include a first redox potential. The anode layer 245 can receive electrical current into the battery cell 120 and output electrons during the operation of the battery cell 120 (e.g., charging or discharging of the battery cell 120). The anode layer 245 can include an active substance. The active substance can include, for example, an activated carbon or a material infused with conductive materials (e.g., artificial or natural Graphite, or blended), lithium titanate ($Li_4Ti_5O_{12}$), or a silicon-based material (e.g., silicon metal, oxide, carbide, pre-lithiated), or other lithium alloy anodes (Li—Mg, Li—Al, Li—Ag alloy etc.) or composite anodes consisting of lithium and carbon, silicon and carbon or other compounds. The active substance can include graphitic carbon (e.g., ordered or disordered carbon with sp2 hybridization), Li metal anode, or a silicon-based carbon composite anode, or other lithium alloy anodes (Li—Mg, Li—Al, Li—Ag alloy etc.) or composite anodes consisting of lithium and carbon, silicon and carbon or other compounds. In some examples, an anode material can be formed within a current collector material. For example, an electrode can include a current collector (e.g., a copper foil) with an in situ-formed anode (e.g., Li metal) on a surface of the current collector facing the separator or solid-state electrolyte. In such examples, the assembled cell does not comprise an anode active material in an uncharged state.

The battery cell 120 can include at least one cathode layer 255 (e.g., a composite cathode layer compound cathode layer, a compound cathode, a composite cathode, or a cathode). The cathode layer 255 can include a second redox potential that can be different than the first redox potential of the anode layer 245. The cathode layer 255 can be disposed within the cavity 250. The cathode layer 255 can output electrical current out from the battery cell 120 and can receive electrons during the discharging of the battery cell 120. The cathode layer 255 can also release lithium ions during the discharging of the battery cell 120. Conversely, the cathode layer 255 can receive electrical current into the battery cell 120 and can output electrons during the charging of the battery cell 120. The cathode layer 255 can receive lithium ions during the charging of the battery cell 120.

The battery cell 120 can include an electrolyte layer 260 disposed within the cavity 250. The electrolyte layer 260 can be arranged between the anode layer 245 and the cathode layer 255 to separate the anode layer 245 and the cathode layer 255. The electrolyte layer 260 can help transfer ions between the anode layer 245 and the cathode layer 255. The electrolyte layer 260 can transfer $Li^+$ cations from the anode layer 245 to the cathode layer 255 during the discharge operation of the battery cell 120. The electrolyte layer 260 can transfer lithium ions from the cathode layer 255 to the anode layer 245 during the charge operation of the battery cell 120.

The redox potential of layers (e.g., the first redox potential of the anode layer 245 or the second redox potential of the cathode layer 255) can vary based on a chemistry of the respective layer or a chemistry of the battery cell 120. For example, lithium-ion batteries can include an LFP (lithium iron phosphate) chemistry, an NMC (Nickel Manganese Cobalt) chemistry, an NCA (Nickel Cobalt Aluminum) chemistry, or an LCO (lithium cobalt oxide) chemistry for a cathode layer (e.g., the cathode layer 255). Lithium-ion batteries can include a graphite chemistry, a silicon-graphite chemistry, or a lithium metal chemistry for the anode layer (e.g., the anode layer 245).

For example, lithium-ion batteries can include an olivine phosphate (Li M PO4, M=Fc and/or Co and/or Mn and/or Ni)) chemistry, LISICON or NASICON Phosphates (Li3M2 (PO4)3 and LiMPO4Ox, M=Ti, V. Mn, Cr, and Zr), for example Lithium iron phosphate (LFP), Lithium iron manganese phosphate (LMFP), a layered oxides (LiMO2, M=Ni and/or Co and/or Mn and/or Fe and/or Al and/or Mg) examples NMC (Nickel Manganese Cobalt) chemistry, an NCA (Nickel Cobalt Aluminum) chemistry, or an LCO (lithium cobalt oxide) chemistry for a cathode layer, Lithium rich layer oxides (Li1+xM1-xO2) (Ni, and/or Mn, and/or Co), (OLO or LMR), spinel (LiMn2O4) and high voltage spinels (LiMn1.5Ni0.5O4), disordered rock salt, Fluorophosphates Li2FcPO4F (M=Fc, Co, Ni) and Fluorosulfates LiMSO4F (M=Co, Ni, Mn) (e.g., the cathode layer 255). Lithium-ion batteries can include a graphite chemistry, a silicon-graphite chemistry, or a lithium metal chemistry for the anode layer (e.g., the anode layer 245). For example, a cathode layer having an LFP chemistry can have a redox potential of 3.4 V vs. $Li/Li^+$, while an anode layer having a graphite chemistry can have a 0.2 V vs. $Li/Li^+$ redox potential.

Electrode layers can include anode active material or cathode active material, commonly in addition to a conductive carbon material, a binder, other additives as a coating on a current collector (metal foil). The chemical composition of the electrode layers can affect the redox potential of the electrode layers. For example, cathode layers (e.g., the cathode layer 255) can include medium to high-nickel content (50 to 80%, or equal to 80% Ni) lithium transition metal oxide, such as a particulate lithium nickel manganese cobalt oxide ("LiNMC"), a lithium nickel cobalt aluminum oxide ("LiNCA"), a lithium nickel manganese cobalt aluminum oxide ("LiNMCA"), or lithium metal phosphates like lithium iron phosphate ("LFP") and Lithium iron manganese phosphate ("LMFP"). Anode layers (e.g., the anode layer 245) can include conductive carbon materials such as graphite, carbon black, carbon nanotubes, and the like.

Anode layers can include Super P carbon black material, Ketjen Black, Acetylene Black, SWCNT, MWCNT, graphite, carbon nanofiber, or graphene, for example.

Electrode layers can also include chemical binding materials (e.g., binders). Binders can include polymeric materials such as polyvinylidenefluoride ("PVDF"), polyvinylpyrrolidone ("PVP"), styrene-butadiene or styrene-butadiene rubber ("SBR"), polytetrafluoroethylene ("PTFE") or carboxymethylcellulose ("CMC"). Binder materials can include agar-agar, alginate, amylose, Arabic gum, carrageenan, cascine, chitosan, cyclodextrines (carbonyl-beta), ethylene propylene diene monomer (EPDM) rubber, gelatine, gellan gum, guar gum, karaya gum, cellulose (natural), pectine, poly(3,4-cthylenedioxythiophene) polystyrene sulfonate (PEDOT-PSS), polyacrylic acid (PAA), poly(m-ethyl acrylate) (PMA), poly(vinyl alcohol) (PVA), poly (vinyl acetate) (PVAc), polyacrylonitrile (PAN), polyisoprene (Plpr), polyaniline (PANi), polyethylene (PE), polyimide (PI), polystyrene (PS), polyurethane (PU), polyvinyl butyral (PVB), polyvinyl pyrrolidone (PVP), starch, styrene butadiene rubber (SBR), tara gum, tragacanth gum, fluorine acrylate (TRD202A), xanthan gum, or mixtures of any two or more thereof.

Current collector materials (e.g., a current collector foil to which an electrode active material is laminated to form a cathode layer or an anode layer) can include a metal material. For example, current collector materials can include aluminum, copper, nickel, titanium, stainless steel, or carbonaceous materials. The current collector material can be formed as a metal foil. For example, the current collector material can be an aluminum (Al) or copper (Cu) foil. The current collector material can be a metal alloy, made of Al, Cu, Ni, Fe, Ti, or combination thereof. The current collector material can be a metal foil coated with a carbon material, such as carbon-coated aluminum foil, carbon-coated copper foil, or other carbon-coated foil material.

The electrolyte layer 260 can include or be made of a liquid electrolyte material. For example, the electrolyte layer 260 can be or include at least one layer of polymeric material (e.g., polypropylene, polyethylene, or other material) that is wetted (e.g., is saturated with, is soaked with, receives) a liquid electrolyte substance. The liquid electrolyte material can include a lithium salt dissolved in a solvent. The lithium salt for the liquid electrolyte material for the electrolyte layer 260 can include, for example, lithium tetrafluoroborate (LiBF$_4$), lithium hexafluorophosphate (LiPF$_6$), and lithium perchlorate (LiClO$_4$), among others. The solvent can include, for example, dimethyl carbonate (DMC), ethylene carbonate (EC), and diethyl carbonate (DEC), among others. The electrolyte layer 260 can include or be made of a solid electrolyte material, such as a ceramic electrolyte material, polymer electrolyte material, or a glassy electrolyte material, or among others, or any combination thereof.

In some embodiments, the solid electrolyte film can include at least one layer of a solid electrolyte. Solid electrolyte materials of the solid electrolyte layer can include inorganic solid electrolyte materials (e.g., oxides, sulfides, phosphides, ceramics), solid polymer electrolyte materials, hybrid solid state electrolytes, or combinations thereof. In some embodiments, the solid electrolyte layer can include polyanionic or oxide-based electrolyte material (e.g., Lithium Superionic Conductors (LISICONs), Sodium Superionic Conductors (NASICONs), perovskites with formula ABO$_3$ (A=Li, Ca, Sr, La, and B=Al, Ti), garnet-type with formula A3B2(XO4)3 (A=Ca, Sr, Ba and X=Nb, Ta), lithium phosphorous oxy-nitride (LixPOyNz). In some embodiments, the solid electrolyte layer can include a glassy, ceramic and/or crystalline sulfide-based electrolyte (e.g., Li3PS4, Li7P3S11, Li$_2$S—P2S5, Li2S—B2S3, SnS—P2S5, Li2S—SiS2, Li2S—P2S5, Li2S—GeS2, Li10GeP2S12) and/or sulfide-based lithium argyrodites with formula Li6PS5X (X=Cl, Br) like Li6PS5Cl). Furthermore, the solid electrolyte layer can include a polymer electrolyte material (e.g., a hybrid or pseudo-solid state electrolyte), for example, polyacrylonitrile (PAN), polyethylene oxide (PEO), polymethyl-methacrylate (PMMA), and polyvinylidene fluoride (PVDF), among others.

In examples where the electrolyte layer 260 includes a liquid electrolyte material, the electrolyte layer 260 can include a non-aqueous polar solvent. The non-aqueous polar solvent can include a carbonate such as ethylene carbonate, propylene carbonate, diethyl carbonate, ethyl methyl carbonate, dimethyl carbonate, or a mixture of any two or more thereof. The electrolyte layer 260 can include at least one additive. The additives can be or include vinylidene carbonate, fluoroethylene carbonate, ethyl propionate, methyl propionate, methyl acetate, ethyl acetate, or a mixture of any two or more thereof. The electrolyte layer 260 can include a lithium salt material. For example, the lithium salt can be lithium perchlorate, lithium hexafluorophosphate, lithium bis(fluorosulfonyl)imide, lithium bis(trifluorosulfonyl) imide, or a mixture of any two or more thereof. The lithium salt may be present in the electrolyte layer 260 from greater than 0 M to about 1.5 M.

Figure 3:
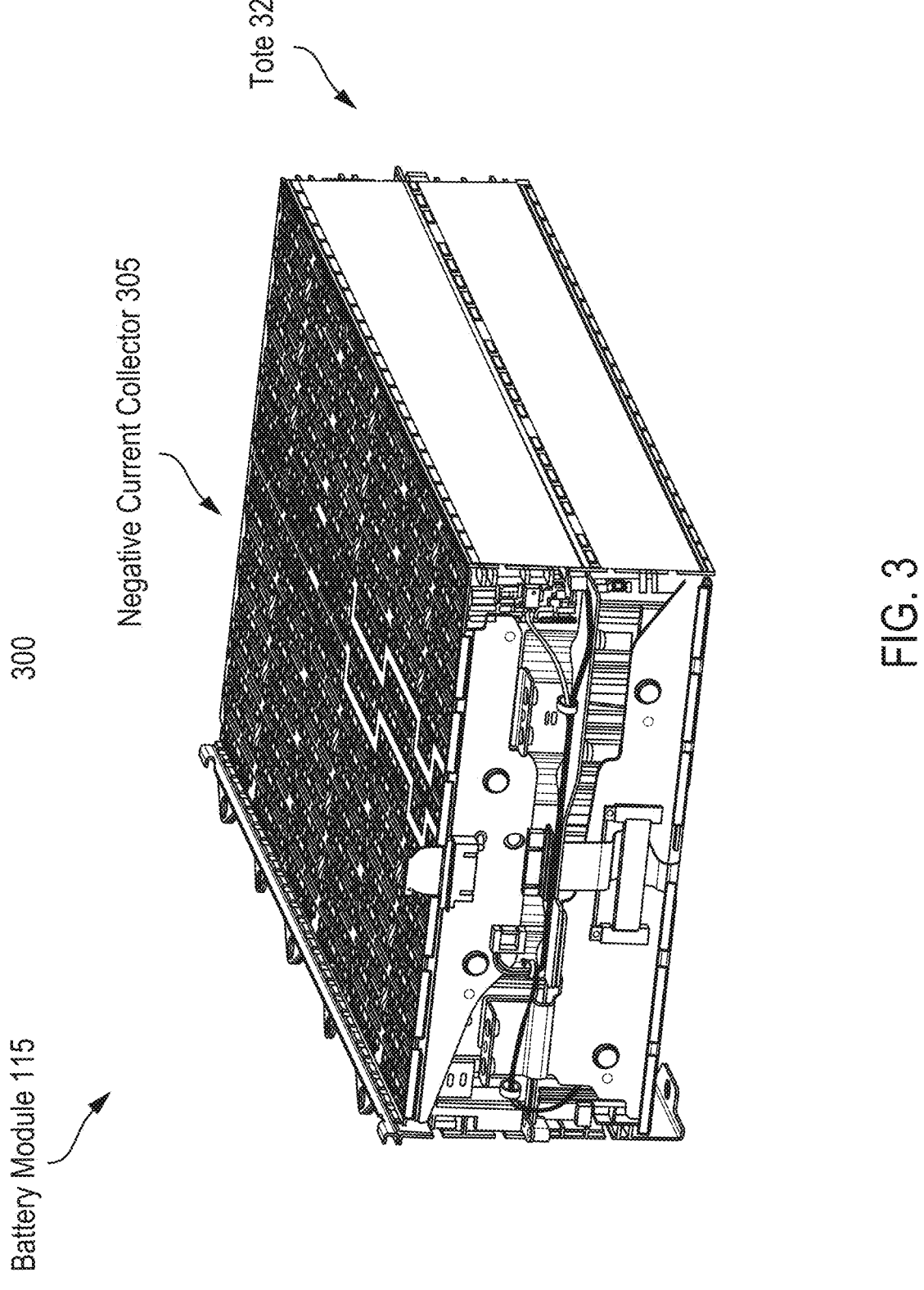
FIG. 3 depicts a front-side view of an embodiment of a battery module.

FIG. 3 depicts a front-side perspective view of an example battery system 300 that can include any combination of battery cells 120, battery modules 115 and battery packs 110 of an electric vehicle (EV) 105. The battery system 300 can include one or more battery modules 115 can include one or more totes 325 that can include or provide structure to support, hold or carry thereon one or more current collectors, such as negative current collector 305 and positive current collector 405. The current collectors 305 and 405 be supported on and attached to outer surfaces of the tote 325. Current collectors 305 and 405 can provide an electrically conductive path for electricity to and from battery cells 120 that can be housed within the battery module 115. The tote 325 can support a negative current collector 305 on one of its outer surfaces or outer perimeters that can be offset with respect to the outer surfaces of the tote 325. For example, a tote 325 can include a top outer surface or a top outer perimeter at which the negative current collector 305 can sit, be disposed on, be affixed to, or otherwise provided. For example, an outer surface of the tote 325 can include a surface on which a current collector 305 or 405 can be affixed or attached. For example, current collectors 305 or 405 can be affixed or disposed at an outer perimeter that can be defined or offset with respect to an outer surface of the tote 325, such as for example at a set distance apart from the outer surface.

Figure 4:
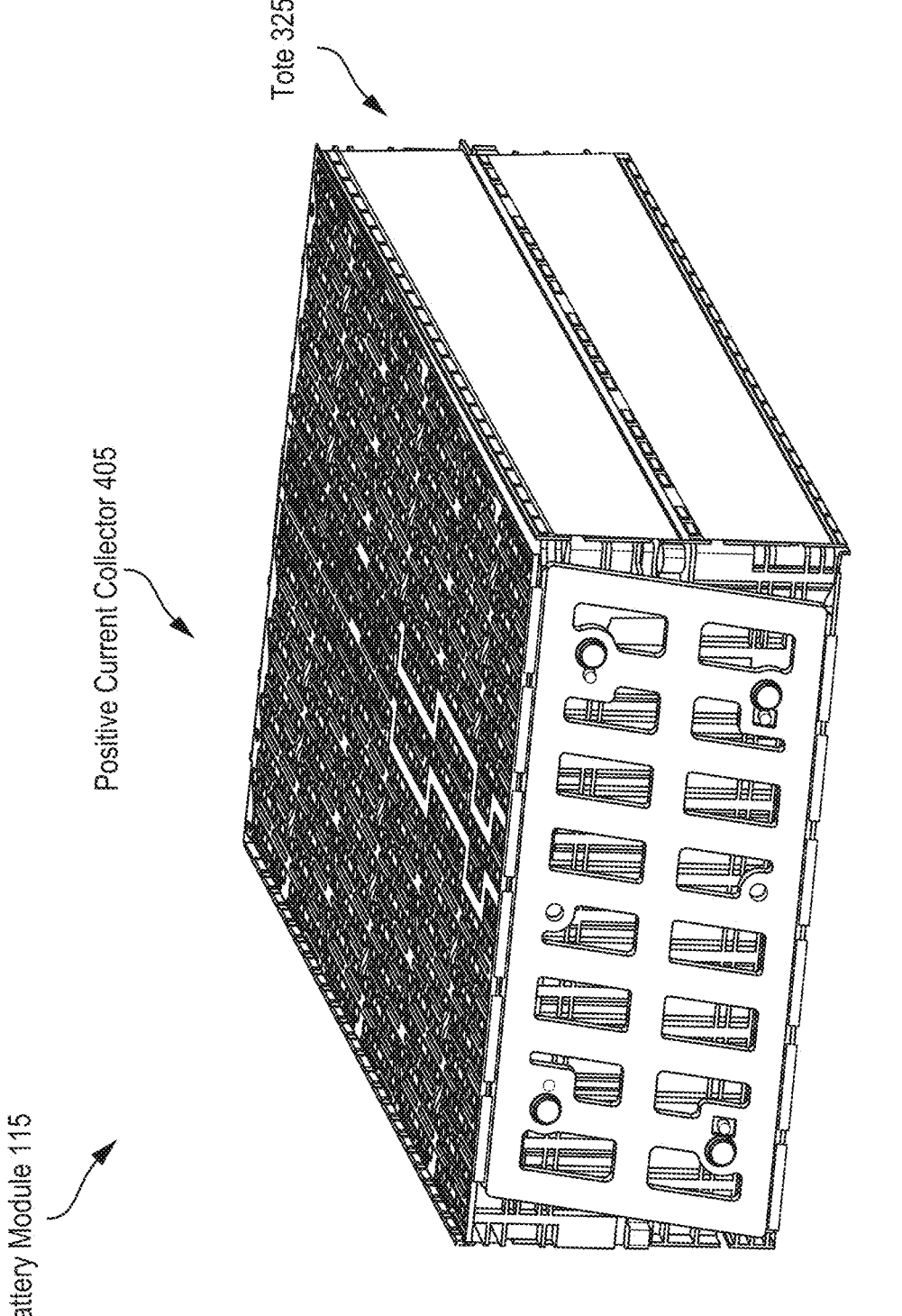
FIG. 4 depicts a rear-side view of an embodiment of a battery module.

FIG. 4 depicts a rear-side perspective view of an example battery module 115 of system 300 in which the tote 325 can provide a structure for supporting a positive current collector 405 on its bottom outer surface or a bottom outer perimeter. The positive current collector 405 can be disposed, affixed or supported on the outer bottom surface of the tote 325 or its outer perimeter, which can be on the opposite side of the battery module 115 from the outer top surface or its perimeter on which the negative current collector 305 is disposed, affixed or supported. For example, the negative current collector 305 and the positive current collector 405 can be disposed on opposite surfaces or planes of the battery module 115 with respect to each other.

Battery module 115 and its components can be shaped in a variety of ways. A battery module 115 can form a battery pack 110 that can comprise the shape and features of the battery module 115 and include battery cells 120. The battery pack 110 can include a tote 325, positive and negative current collectors 305 and 405, busbars 310, 315 and 410 and other features of a battery module 115. While the battery module 115 illustrated in FIGS. 3 and 4 is shaped as a rectangular prism, the battery module 115 can be any shape, such as a cube, a pyramid, a trigonal prism, a tetragonal prism, tetrahedron, decahedron, dodecahedron, or any other polyhedron, a sphere, a semi-sphere, or a cylinder. The shape can be defined by any number of battery module 115 components, such as tote 325, current collectors 305, 405, busbars and other components of the battery module 115. For example, the tote 325 can be shaped as a rectangular prism and can support on its outer surfaces or perimeters any number of more current collectors 305 or 405. For example, tote 325 can support or carry thereon a negative current collector 305, which can be affixed to or disposed on a surface or a perimeter from the surface of the tote 325. For example, tote 325 can support or carry thereon a positive current collector 405, which can be affixed to or disposed on a surface or a perimeter from the surface of the tote 325 that is different from or opposite to the surface on which the negative current collector 305 is disposed or affixed.

The tote 325 can include, house, enclose or comprise battery cells 120, which can be electrically coupled with the current collectors 305 and 405. Battery cells 120 can be organized within the tote 325 so that they are supported and held in place by the tote 325. Battery cells 120 in the tote 325 can be electrically coupled or connected to by components of the current collector 305 and 405, such as tabs. Battery cells 120 can be in electrical contacts with the current collectors 305 or 405 and can exchange charge, power or electricity with other components of the EV 105 via current collectors 305 or 405.

Tote 325 can include variety of materials for providing structural support, such as any one or more metals and metal alloys, ceramics, plastics and more. Tote 325 can comprise a hollow structure and allow for one or more air flow paths for thermal management and natural convection cooling. Tote 325 can include multiple vertical and horizontal sections separate by air gaps. Tote 325 can include structures and components to provide mechanical and structural support for the battery module 115, separated by air gaps. Tote 325 can include one or more interfaces for interfacing, connecting with or coupling with any one or more of busbars or current collectors 305 or 405.

Figure 5:
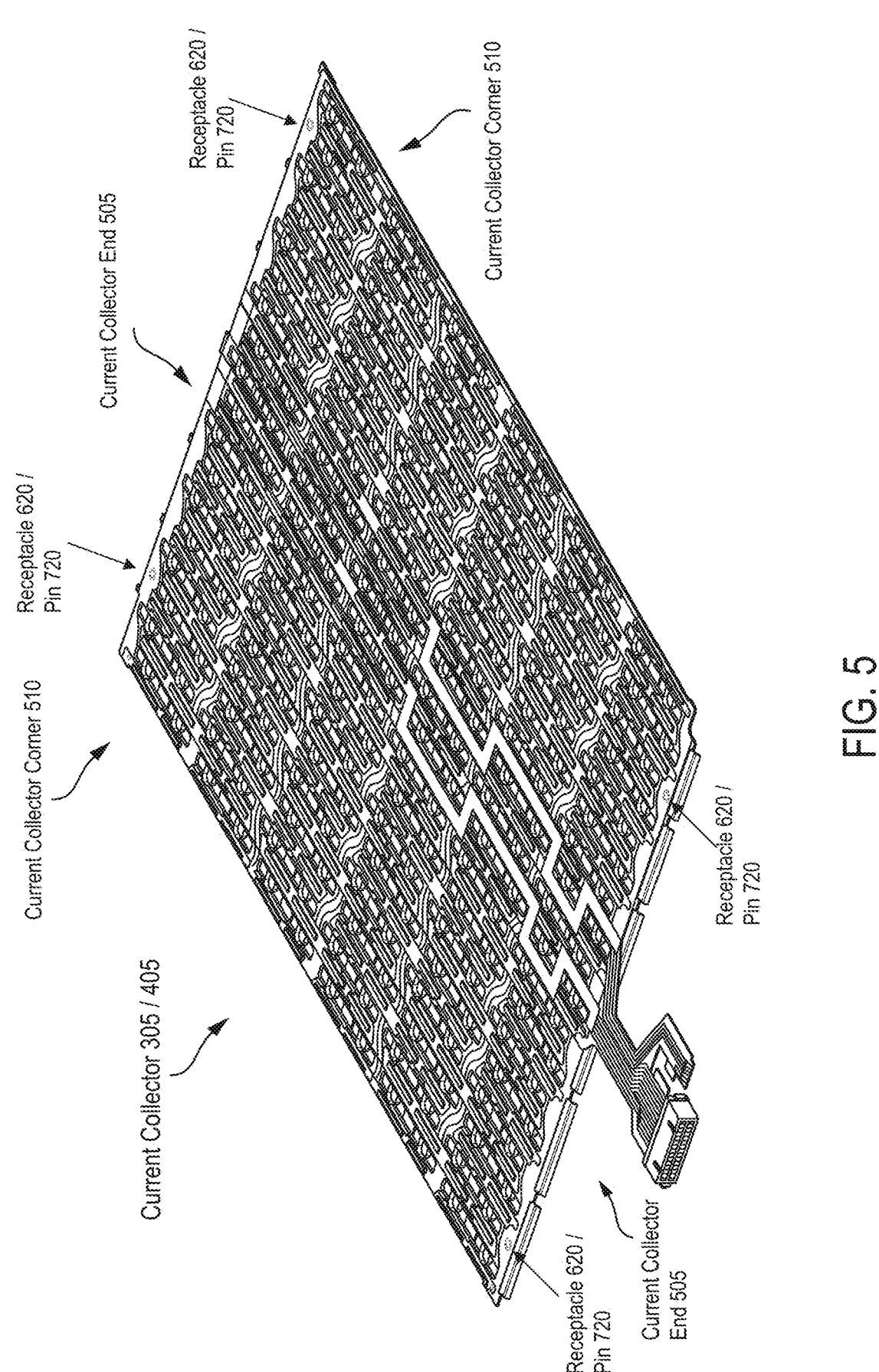
FIG. 5 depicts an example of a current collector with pins and receptacles.
Figure 6:
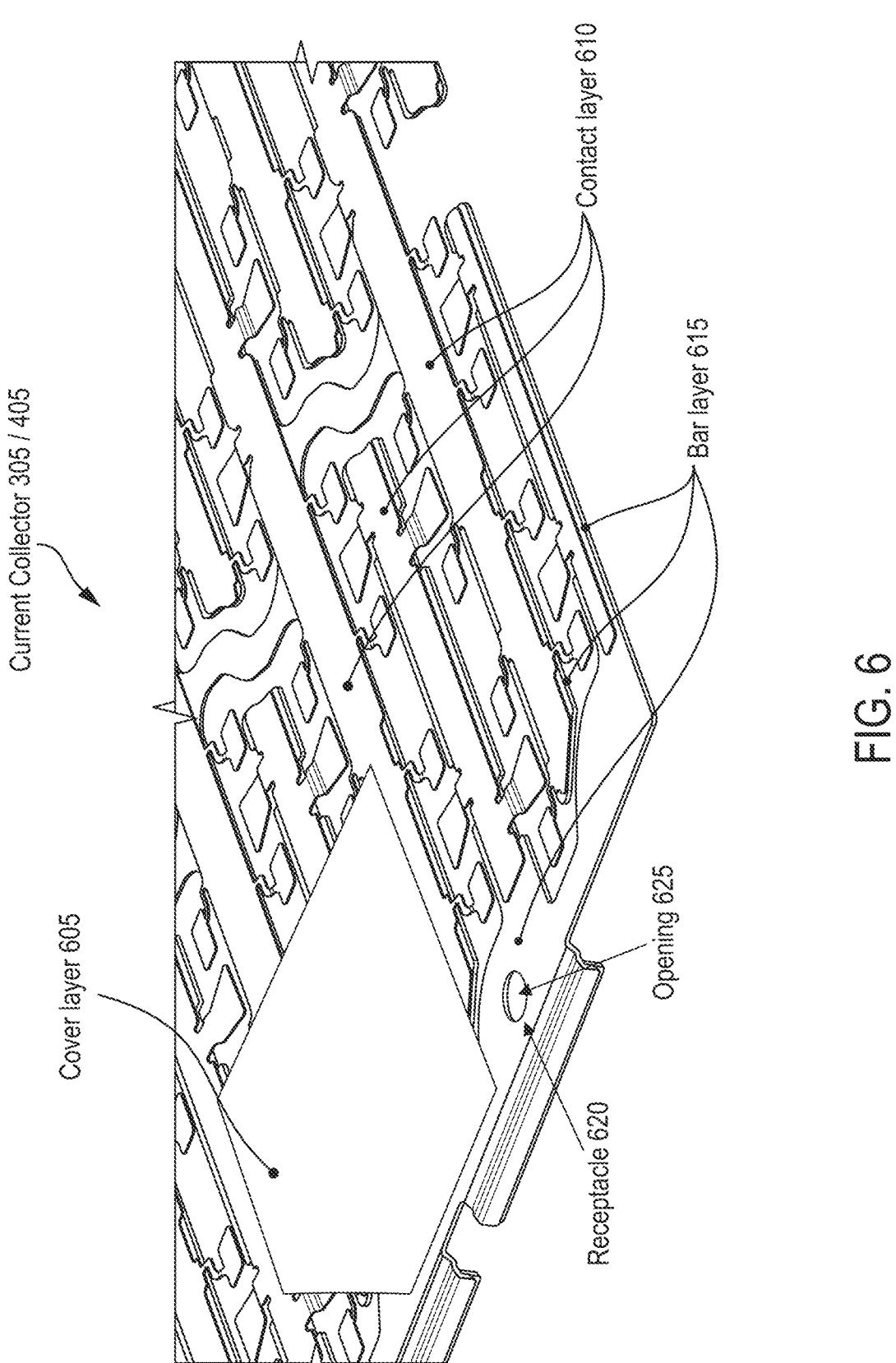
FIG. 6 depicts a close-up view of a current collector example with its internal layers.

FIGS. 5 and 6 depict a current collector 305 or 405 having multiple features, such as cutouts, ribs, tabs, channels, openings, through holes and more. Current collectors 305 or 405 can include multiple layers, such as a cover layer 605, a contact layer 610 and a bar layer 615. Current collector 305 or 405 can include electrically conductive materials to provide an electrically conductive path for a high current density throughput via the current collector 305 or 405 to provide the energy for the EV 105. For example, a bar layer 615 or the contact layer 610 can include materials with high electric conductivity and can be electrically coupled. Current collectors 305 or 405 can include one or more receptacles 620 that can include openings 625, as well as pins 720 that can be inserted into receptacles 620 or its openings 625 to align the current collectors 305 or 405 with the tote 325.

FIG. 5 depicts a current collector 305 or 405 that can include a current collector ends 505 on each side of the current collector 305 or 405 and any number of current collector corners 510. Current collector 305 or 405 can include one or more receptacles 620 that can be paired with, or correspond to, one or more pins 720 on a tote 325. For example, one or more pins 720 from the tote 325 can insert into one or more receptacles 620 of the current collector 305 or 405 and align the current collector 305 or 405 with the tote 325 during the manufacturing or assembly of the battery module 115. Current collector 305 can include one or more pins 720 that can be paired with, or correspond to, one or more receptacles 620 on a tote 325. For example, one or more pins 720 from the current collector 305 or 405 can insert into one or more receptacles 620 of the tote 325 and align the current collector 305 or 405 with the tote 325. Current collector 305 can include any combination of pins 720 and receptacles 620, which can align with and correspond to any number of their corresponding receptacles 620 or pins 720 on the tote 325.

Receptacle 620 can include any structure, object or feature for receiving a pin 720. Receptacle 620 Receptacle 620 can include a through hole, such as opening 625 (shown in FIG. 6) into and through which a pin 720 can be inserted. Receptacle 620 can include a closed cavity into which pin 720 can be inserted. The cavity can include sides of an opening, such as opening 625, past which pin 720 can be inserted and a sealed end for stopping, interfacing with or connecting with the tip of the pin 720. Receptacle 620 can include an open cavity having sides of an opening past which pin 720 can be inserted with an opening at the end of the cavity. For example, pin 720 can past through the open end. For example, the pin 720 may not reach past the open end and may be stopped by the sides of the cavity. The sides of the cavity of the receptacle 620 can be narrowed so that they stop the pin 720 as the pin 720 is inserted deeper into the receptacle 620. Receptacle 620 can include the opening 625 having a cross-section that can include any shape, such as for example, circular or elliptical, triangular, square, rectangular, pentagonal, hexagonal, octagonal, decagonal or any include the shape of any polygon. Receptacle 620 can be located or formed on, or in, a surface of a current collector 305 or 405, a tote 325, a busbar of the battery module 115 or any other part of the battery module 115.

Receptacle 620 can include a tolerance. The tolerance can be the same for the entire opening or different, based on direction or orientation. For example, tolerance of the opening 625 in one direction can be different than the tolerance of the opening 625 in another direction. For example, a receptacle 620 can include an opening having a first tolerance along a direction of length of the opening 625 and a second tolerance along a direction of width of the opening 625. Tolerance can include any size range defined based on the size of the opening, such as between 1% and 20% of the size of the opening. For example, tolerance can have up to 1% of the opening size, 2% of the opening size, 5% of the opening size, 10% of the opening size, 15% of the opening size, 20% of the opening size or more than 20% of the opening size. Tolerance can include any size range based on the size of the pin 720 cross-section diameter size, such as between 1-200% of the pin cross-section diameter size. For instance, tolerance can include 1%, 10%, 30%, 50%, 100%, 150%, 200% or more than 200% of the cross-sectional diameter size of pin 720. Tolerances can differ along the length and the width of the opening 625. Tolerances can differ along any direction with respect to the center of the opening 625. Tolerances can allow for the pin 720 to move when inserted into the opening 625 by one distance in one direction and by another distance in another direction.

Pin 720 can include any structure, object or feature that can be inserted into the receptacle 620. Pin 720 can include a protrusion or a projection from a surface, such as the surface of the current collector 305 or 405. Pin 720 can include a protrusion on, or a projection from, a surface, such as a surface of a current collector 305 or 405, tote 325, a busbar of a battery module 115 or any other component of the battery module 115. Pin 720 can include an elongate post or a column that can project vertically from a surface. Pin 720 can include a cross-section that is vertical to the length or height of the pin 720, which can include any shape. For example, the cross-section of the pin 720 can be, for example, circular or elliptical, triangular, square, rectangular, pentagonal, hexagonal, octagonal, decagonal or any include the shape of any polygon. The cross-section of the pin 720 can be equal across the length or height of the pin 720, or can be different. For example, the pin 720 can include a cross-section that is narrower near the top of the pin 720 than the cross-section at the middle portion or the base portion of the pin 720. Pin 720 can include the same or a different cross-section as receptacle 620 or its opening 625. For example, pin 720 can be formed or shaped to fit and entirely fill the receptacle 620. For example, pin 720 can be formed or shaped to be narrower than receptacle 620 or its opening 625, so that it has a range of movement inside the receptacle 620 or opening 625. Pin 720 can be located or formed on, or in, a surface of a current collector 305 or 405, a tote 325, a busbar of the battery module 115 or any other part of the battery module 115.

For example, a current collector 305 or 405 can include one, two, three, four or more than four pins 720 or one, two, three, four or more than four receptacles 620, as well as any number of combination of pins 720 and receptacles 620, such as one receptacles 620 and one pin 720 or two receptacles 620 or two pins 720. In the illustrated example, current collector 305 or 405 is illustrated as a rectangular sheet, having four current collector ends 505 and four current collector corners 510, with a pin 720 or receptacle 620 in each of the four corners 510 and near the ends 505. However, it is understood that current collector 305 or 405 can comprise any other shape and can include any number of ends 505 or corners 510 and can have any number of receptacles 620 or pins 720 disposed in portion of current collector 305 or 405.

FIG. 6 depicts a close-up view of the current collector 305 or 405. FIG. 6 depicts current collector 305 or 405 comprising a cover layer 605, a contact layer 610 and a bar layer 615. The current collector 305 or 405 can include any arrangement of the layers. For example, the current collector 305 or 405 can include a bar layer 615, on top of which a contact layer 610 is disposed, welded or affixed, on top of which is a cover layer 605 for electrically insulating the current collector 305 or 405. For example, the current collector 305 or 405 can include a bar layer 615 that is on top of a contact layer 610, with a cover layer 605 on top of the bar layer 615. Current collector 305 or 405 can include additional layers, including intervening layers between any one or more of layers 605, 610 or 615. Current collector 305 or 405 can include one or more insulating layers beneath the bar layer 615 and contact layer 610, such as a layer that can include the same or similar features as the cover layer 605 to electrically insulate the layers 610 and 615 from the tote 325 beneath. FIG. 6 also shows receptacle 620 comprising an opening 625 into which, or through which, pin 720 can be inserted.

Bar layer 615 can include a sheet or a slab of electrically conductive material extending across the length and width of the current collector 305 or 405. Bar layer 615 can include a plate or a sheet of electrically conductive material, such as copper, silver, gold, aluminum, beryllium, magnesium, indium or any other electrical conductor. Bar layer 615 can include a sheet having a thickness of between 100 micrometers and 5 millimeters. The thickness can be commensurate with the width and the length of the current collector 305 or 405 to allow for a sufficient current density across the current collector 305 or 405. For example, the thickness of the bar layer 615 can be up to about 100 um, 200 um, 300 um, 400 um, 500 um, 600 um, 700 um, 800 um, 900 um, 1 mm, 1.5 mm, 2 mm, 2.5 mm, 3 mm, 4 mm, 5 mm. For example, bar layer 615 can include a thickness of between 300 to 600 um, inclusively, such as for example 300 um, 400 um, 500 um or 600 um. Bar layer 615 can include a thickness that is greater than the thickness of the contact layer 610.

Contact layer 610 can include a sheet or a slab of electrically conductive material extending across the length and width of the current collector 305 or 405. Bar layer 615 can be electrically coupled with the bar layer 615, such as via welding, physical interlock or connection or be integrally formed with at least a portion of the bar layer 615. Contact layer 610 can include a plate or a sheet of electrically conductive material, such as copper, silver, gold, aluminum, beryllium, magnesium, indium or any other electrical conductor. Contact layer 610 can include a sheet having a thickness of between 10 micrometers and 500 micrometers, such as, for example, up to about 10 um, 20 um, 30 um, 40 um, 50 um, 60 um, 70 um, 80 um, 90 um, 100 um, 120 um to 150 um, 170 um, 200 um, 300 um, 400 um or 500 um. Contact layer 610 can include a thickness that is less than the thickness of the bar layer 615. For example, the thickness of a contact layer 610 can be a fraction of the thickness of the bar layer 615, such as about up to about ¾, ⅔, ½, ⅓, ¼, ⅕, ⅙ or ⅛ of the thickness of the bar layer 615.

Receptacle 620 can include an opening 625. The opening 625 can be, for example, circular, elliptical or polygonal. The opening 625 can be a through-hole opening or an opening into a closed or an open cavity into which pin 720 can be inserted. Opening 625 can be a through-hole that can propagate through entire current collector 305 or 405. Opening 625 can be a hole through one or more layers of current collector 305 or 405, but not all the layers of the current collector.

Locations for the receptacle 620, its opening 625, or a pin 720, can be on any part of current collector 305 or 405, such as at or near current collector ends 505 or in the current collector corners 510. For example, receptacles 620, openings 625 or pins 720 can be located near, about or in end regions of the current collector 305 or 405, such as about 1-20 millimeters from the edge of the current collector 305 or 405, including, for example, 5 mm, 10 mm, or 15 mm near, about or from the edge of the current collector 305 or 405. For example, receptacles 620, openings 625 or pins 720 can be located in the corners 510 of the current collector 305 or 405, such as in the areas between about ¼ of the length of each of the two abutting edges that form the corner 510. For example, receptacles 620, openings 625 or pins 720 can be located in the current collector corners 510, such as about anywhere within 50 millimeters from the edge corner where two edges of the current collector 305 or 405 meet or intersect.

Figure 7:
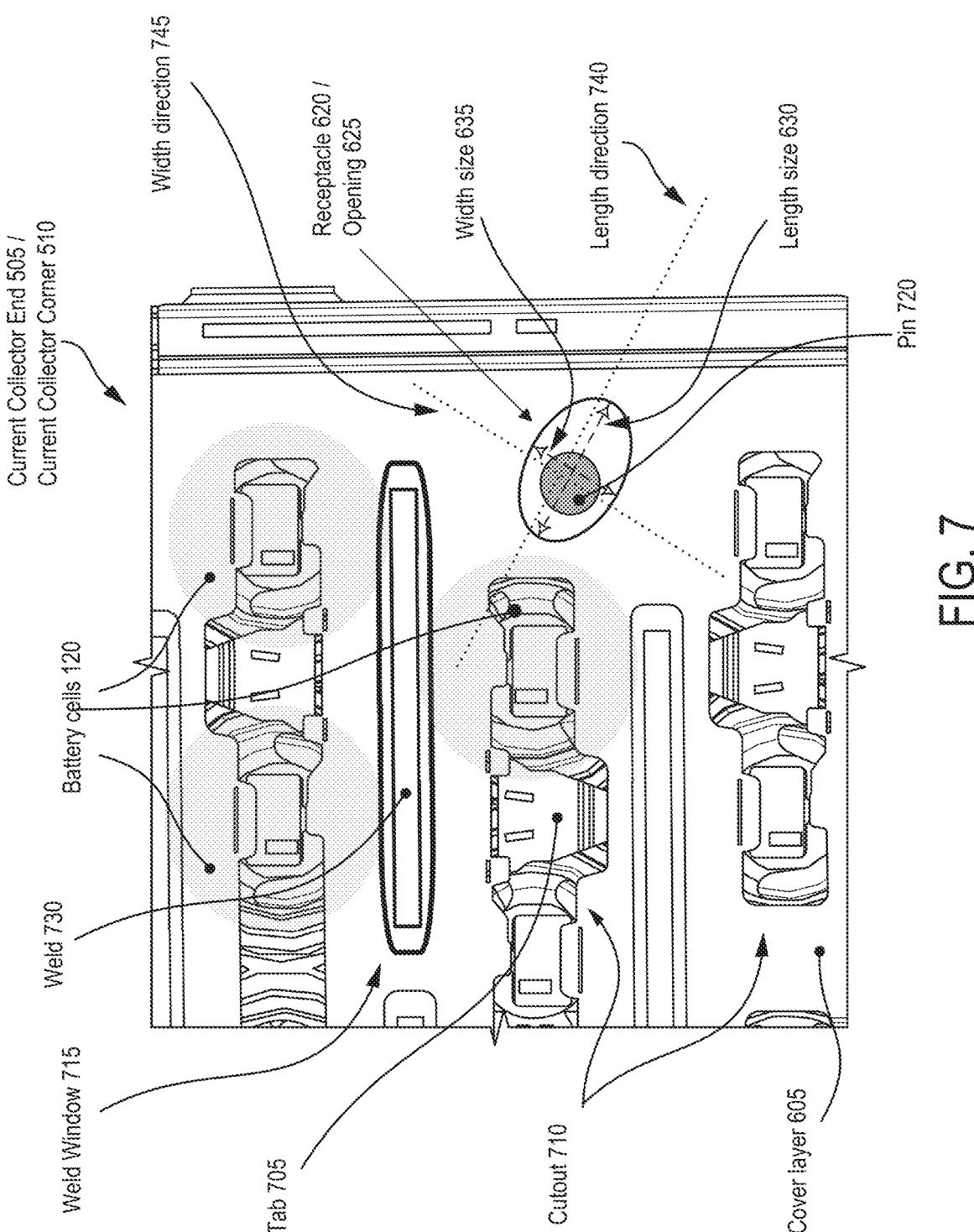
FIG. 7 depicts an example of a current collector end or a current collector corner.

FIG. 7 depicts a close up of a current collector end 505 or a current collector corner 510. FIG. 7 depicts a portion of the current collector 305 or 405 corresponding to an area forming a current collector end 505 or a current collector corner 510 in which a receptacle 620 or pin 720 can be provided or disposed. Current collector 305 or 405 can be disposed or affixed over several battery cells 120 of the battery module 115. The areas of the current collector 305 or 405 beneath which battery cells 120 are located are highlighted as light gray circles to show how tabs 705 of the current collector 305 or 405 electrically connect to the battery cells 120. Visible through the cutouts 710 in the cover layer 605 of the current collector 305 or 405 are tabs 705 standing over, and electrically connecting with, the battery cells 120. Also illustrated are weld windows 715, which can include openings in the cover layer 605 of the current collector 305 or 405, for welding bar layer 615 with the contact layer 610 via weld 730. Weld window 715 can include a cutout that has a height of between 2 mm and 10 mm, such as 4 mm, and a width that is between 50 mm and 100 mm, such as 72-75 mm.

FIG. 7 illustrates an example of a pin 720 inserted into an opening 625 of a receptacle 620. The pin 720 can correspond to the shape and size of the opening 625 and fill out the cross-section of the opening 625. The pin 720 can be smaller than the opening 625 and can maneuver within the opening 625. Pin 720 can be inserted in and occupy any portion of the opening 625. Pin 720 can include a cross section that is same or different than the cross section of the opening 625.

The opening 625 of the receptacle 620 can include a length size 630 of the opening 625 and a width size 635 of the opening 625. The length size 630 can be a size of the opening 625 measured or established in a length direction 740. The width size 635 can be a size of the opening 625 measured or established in the width direction 745. The length direction 740 and the width direction 745 can be any direction, oriented in any angle with respect to the plane of the current collector 305 or 405 or the plane of the surface of the tote 325 on which they are formed.

In an example, a length size 630 of an opening 625 of a receptacle 620 can correspond to the size of the opening 625 along a length direction 740. For example, a length size 630 can correspond to a size of an elongate opening 625 of the receptacle 620 along a longest portion of the opening 625. The opening 625 can be an elliptical opening, a rectangular opening, a triangular opening, a square opening, or any other polygonal opening. For example, the length size 630 can include a diameter of an elongated elliptical opening along a length direction 740 that corresponds to longest diameter across the center of the elongate opening 625. For example, the direction along which a longest diameter of the elongate elliptical opening 625 is measured (e.g., length size 630) can align with, correspond to, or be parallel to, the length direction 740. The width size 635 can correspond to the size of the opening 625 along a shortest direction of an elongate elliptical opening 625 of the receptacle 620. For example, the direction along which a shortest diameter of the elongate elliptical opening 625 is measured (e.g., width size 635) can align with, correspond to, or be parallel to, the width direction 745. The width size 635 can correspond to the size of the opening 625 along a shortest direction of an elongate elliptical opening 625 of the receptacle 620.

A length size 630 for measuring a length direction 740 of an opening 625 can be oriented or directed in any direction or along any angle, such as along a length, width or any diagonal angle along the surface of a current collector 305 or 405 or a tote 325. A width size 635 for measuring a width direction 745 can be oriented or directed in any direction or along any angle, such as along a length, width or any diagonal angle along the surface of a current collector 305 or 405 or a tote 325. The width direction 745 along which the width size 635 can be measured can be a different direction than the length direction 740 along which the length size 630 is measured. For example, length direction 740 can be orthogonal or perpendicular to the width direction 745. For example, length direction 740 can be at any angle from the width direction 745, between 0 and 360 degree angle. For example, length direction 740 can be offset from the width direction 745 by about 10 degrees, 20 degrees, 30 degrees, 45 degrees, 60 degrees, 70 degrees, 80 degrees or 90 degrees. For example, length direction 740 can be offset from the width direction 745 by about 100 degrees, 110 degrees, 120 degrees, 135 degrees, 150 degrees, 160 degrees, 170 degrees or 180 degrees.

Depending on the size and shape of the receptacle 620 or its opening 625, the length size 630 and width size 635 can be same or different. For example, the length size 630 and width size 635 of an opening 625 can be same length or size, such as for example, when the opening 625 is circular, square, hexagonal, octagonal or any other shape that can have same sizes in multiple directions. For example, the length size 630 and width size 635 of an opening 625 can be different length or size, such as for example, when the opening 625 is rectangular, elliptical, triangular, square or polygonal with any shape that can have different sizes in multiple directions. Although in the illustrated example, length size 630 is greater than the width size 635, it is understood that width size 635 can be larger than the length size 630.

For example, length sizes 630 of openings 625 on a battery module 115 can be measured along the same or a different length direction 740 and width sizes 635 of openings 625 on the battery module 115 can be measured along the same or a different width direction 745. For example, one or more openings 625 of a battery module can have their length size 630 measured along the same length direction 740 and have their width size 635 measured along the same width direction 745. For example, one or more openings 625 of a battery module can have their length size 630 measured along a different length direction 740 and their width size 635 measured along a different width direction 745.

Figure 8:
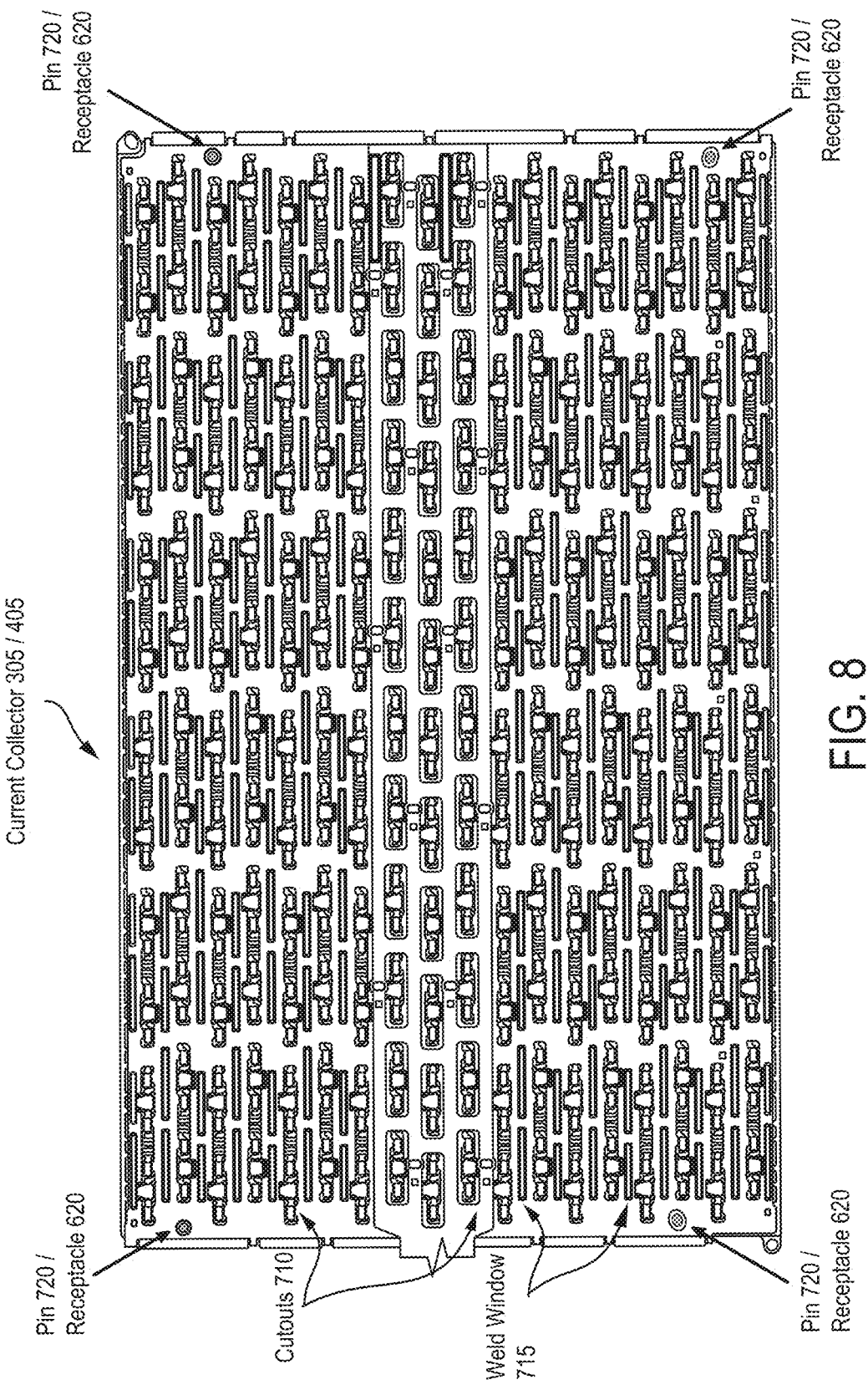
FIG. 8 depicts a top view of an example of a current collector.

FIG. 8 depicts a top view of a current collector 305 or 405. The current collector 305 or 405 can include a series of features, such as cutouts 710 and weld windows 715. Cutouts 710 and weld windows 715 can be disposed throughout the current collector 305 or 405 and organized into rows or columns. Pins 720 or receptacles 620 can be disposed throughout the current collector 305 or 405, such as for example at the current collector ends 505. Any combination of pins 720 or receptacles 620 can be disposed, formed or provided at the current collector ends 505. For example, pins 720 or receptacles 620 can be provided about 5, 10, 15 or 20 millimeters from a first edge of the current collector 305 or 405, such as at the right side of the illustrated current collector 305 or 405. For example, pins 720 or receptacles 620 can be provided about 5, 10, 15 or 20 millimeters from a second edge of the current collector 305 or 405, such as at the left side of the illustrated current collector 305 or 405.

Any combination of pins 720 or receptacles 620 can be disposed, formed or provided at the current collector corners 510. For example, a pin 720 or a receptacle 620 can be provided in the top right current collector corner 510 that can be formed between about ¼ (a quarter) of the length of the top edge and about ¼ (a quarter) of the length of the right edge of the current collector 305 or 405 depicted in FIG. 8. For example, a pin 720 or a receptacle 620 can be provided in the top left current collector corner 510 that can be formed between about ¼ of the length of the top edge and about the ¼ of the length of the left edge of the current collector 305 or 405 depicted in FIG. 8. For example, a pin 720 or a receptacle 620 can be provided in the bottom left current collector corner 510 that can be formed between about ¼ of the length of the bottom edge and about the ¼ of the length of the left edge of the current collector 305 or 405 depicted in FIG. 8. For example, a pin 720 or a receptacle 620 can be provided in the bottom right current collector corner 510 that can be formed between about ¼ of the length of the bottom edge and about the ¼ of the length of the right edge of the current collector 305 or 405 depicted in FIG. 8.

Figure 9:
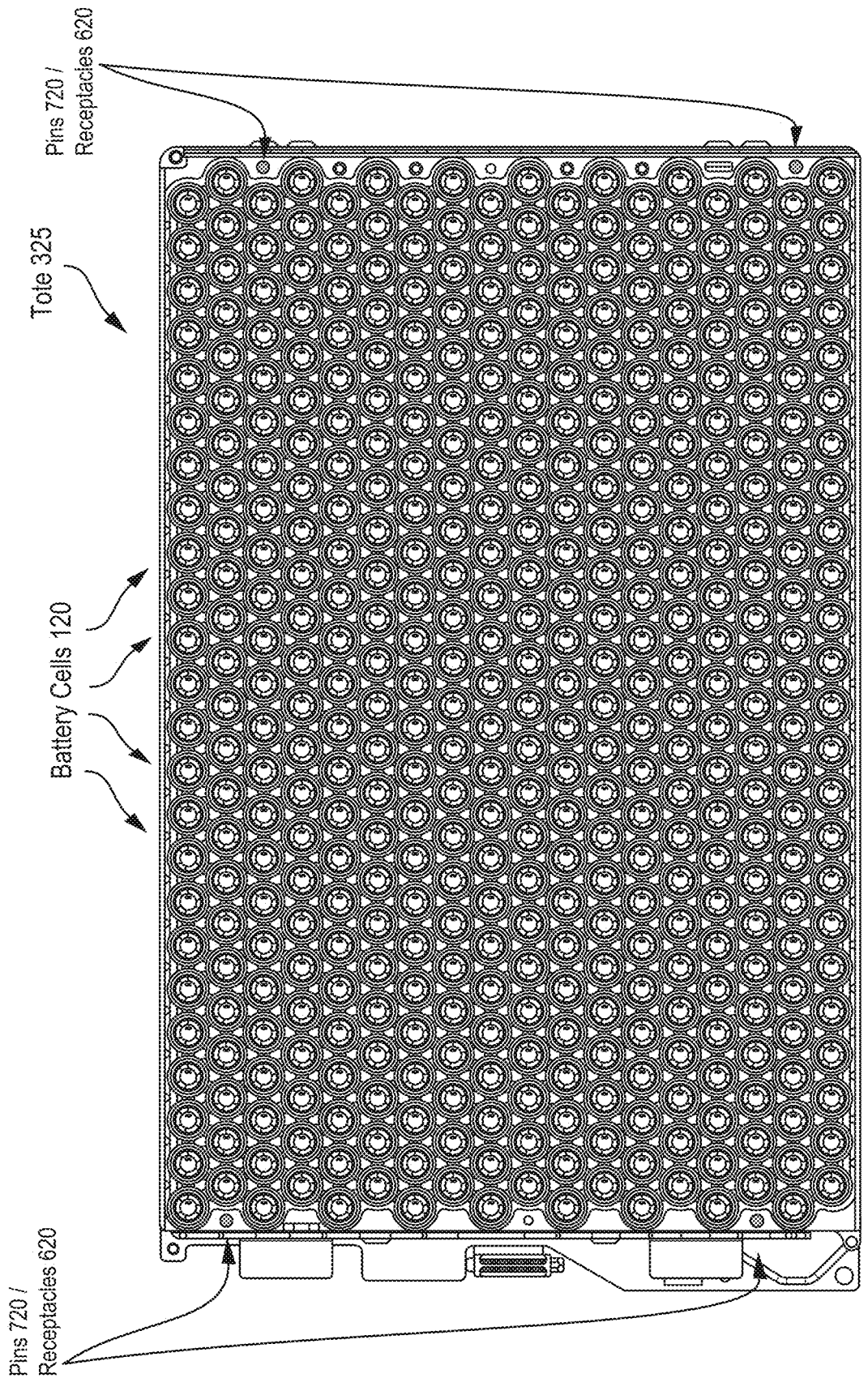
FIG. 9 depicts a top view of an example of a tote.

FIG. 9 illustrates a top view of an example tote 325 comprising or housing a number of battery cells 120. Battery cells 120 can be arranged in rows or columns and can be disposed so as to vertically align with the tabs 705, cutouts 710 or weld windows 715 of the current collectors 305 or 405 beneath which they are located. A tote 325 can include any arrangement of pins 720 or receptacles 620 that can correspond to a current collector 305 or 405, such as the one illustrated in FIG. 8. For example, a tote 325 can include one or more pins 720 or receptacles 620 that can be disposed at or near the ends of the tote 325, so as to align with their corresponding receptacles 620 or pins 720 on the current collector ends 505 of the current collector 305 or 405, such as those illustrated in FIG. 8. For example, a tote 325 can include one or more pins 720 or receptacles 620 that can be disposed at or near the corners of the tote 325, so as to align with their corresponding receptacles 620 or pins 720 on the current collector corners 510 of the current collector 305 or 405, such as those illustrated in FIG. 8.

Figure 10:
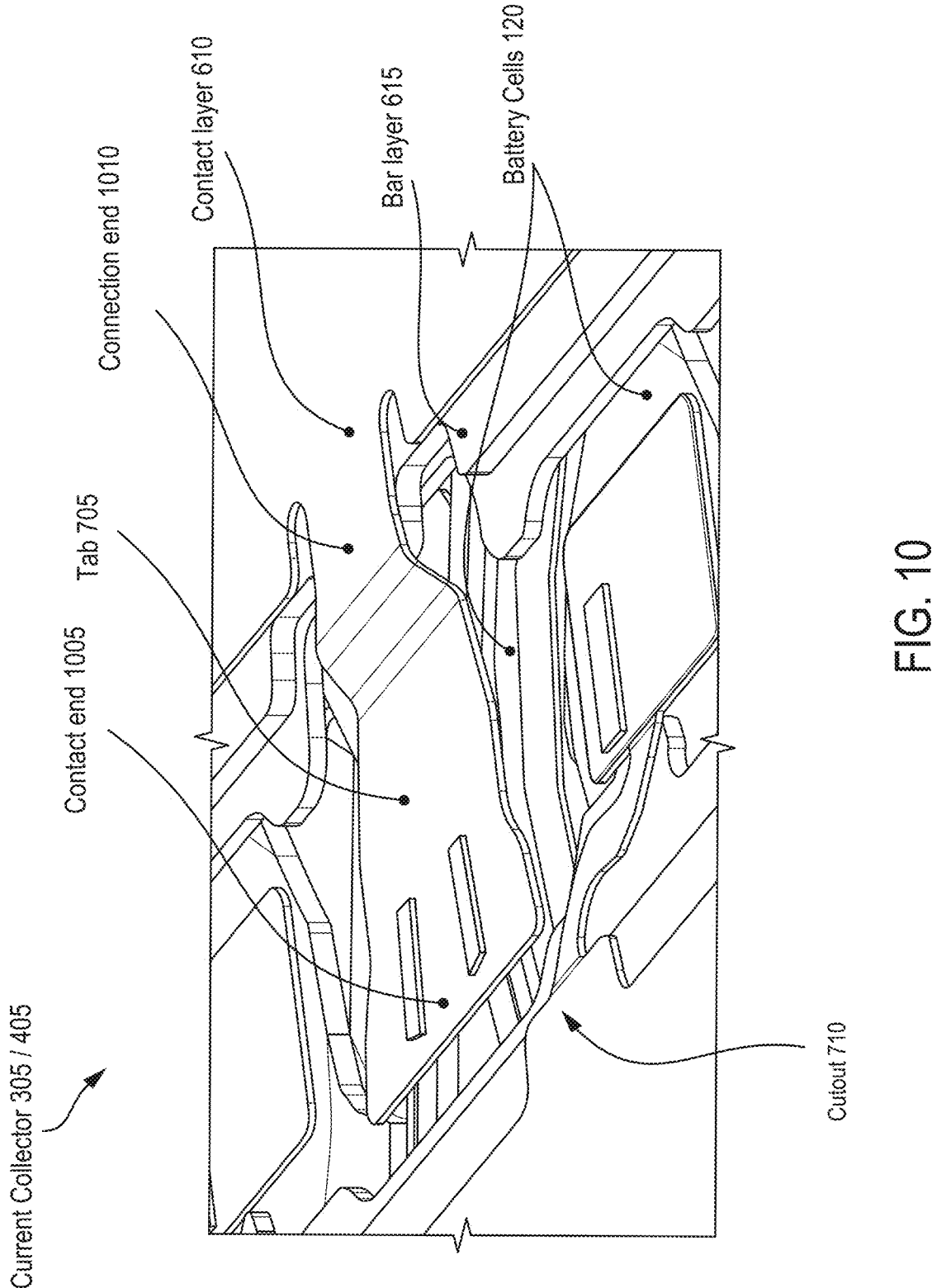
FIG. 10 depicts a close up view of a cutout with a tab of the current collector.

FIG. 10 depicts a close up example of a cutout 710 of a current collector 305 or 405. The cutout 710 can be formed through a cover layer 605 of the current collector 305 or 405 to expose internal layers, such as contact layer 610 and bar layer 615. Visible through the cutout 710 can be a tab 705. Tab 705 can be physically and electrically connected to, or coupled with, the contact layer 610, via a connection end 1010. Tab 705 can be a tab made from the sheet of metal forming the contact layer 610 and can be suspended from and be connected with the contact layer 610 through connection end 1010. Connection end 1010 can be a narrow end of the tab. The opposite end of the tab 705, the contact end 1005, can be the end of the tab 705 that contacts the battery cells 120. Contact end 1005 can contact the battery cells 120 by touching or pushing against the top surface of the battery cells 120, or their electrical terminal. Connection end 1010 of the tab 705 can create a tension or force pushing downward and making the contact end 1005 of the tab 705 push down against the top surface of the battery cells 120 beneath the tab 705. As shown in FIG. 10, contact layer 610 can be disposed on top of the bar layer 615. Beneath the bar layer 615 can be another layer, such as an electrically insulating layer to insulate the battery cells 120 from the bar layer 615. Tab 705 can contact one or more battery cells 120 inside or through the cutout 710, such as for example two battery cells 120 at the same time.

Figure 11:
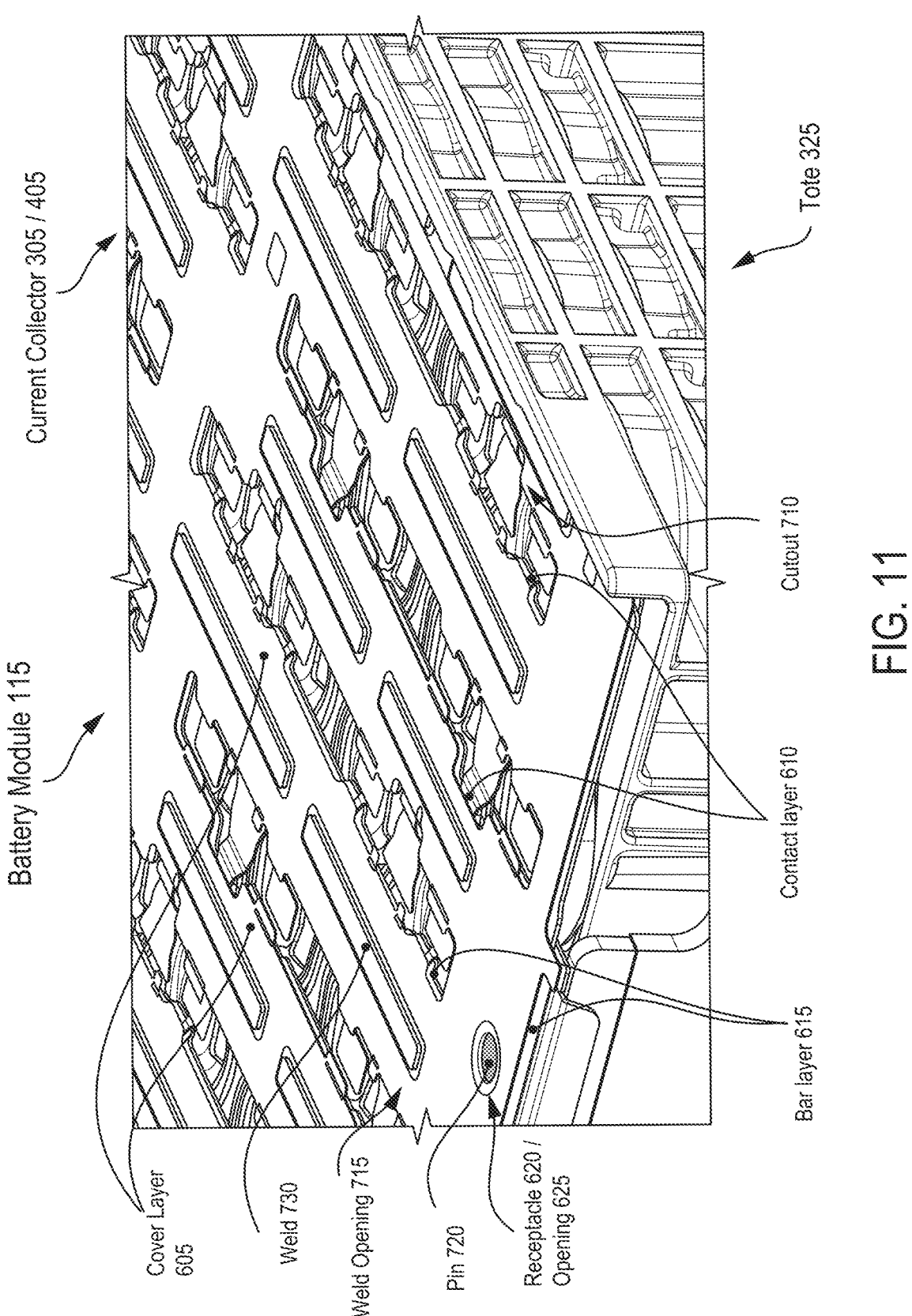
FIG. 11 depicts a zoom-in view of a battery module with the current collector aligned and interfaced with the tote.

FIG. 11 depicts an example of a battery module 115 having an aligned current collector 305 or 405 aligned and fixed on tote 325. Current collector 305 or 405 can include a cover layer 605 that covers the contact layer 610 and a bar layer 615 of the current collector 305 or 405. Through cover layer 605 can be found openings, such as cutouts 710 and weld openings 715. Welds 730 can be performed through the weld openings 715 to weld, combine or join together portions of contact layer 610 and portions of bar layer 615. Welds 730 can allow for improved electrical contact between the contact layer 610 and its tabs 705 and bar layer 615. FIG. 11 also illustrates an example of a pin 720 inserted through an opening 625 of a receptacle 620. In the illustrated example, pin 720 can fit the shape and size of the opening 625. The opening 625 can be a circular through hole opening and the pin 720 can have a corresponding circular and through-hole cross-section to create a tight fit inside the opening 625. By inserting pin 720 through the opening 625 of the receptacle 620, the current collector 305 or 405 can be aligned with and affixed to the tote 325, thereby integrating with the battery module 115.

In some aspects, the present solution can be directed to a battery system, such as the system 300. The battery system 300 can include a battery pack 110, battery module 115, battery cells 120 or any combination thereof. The system 300 can include a receptacle 620 having an opening 625. A length 630 of the opening can be different from a width 635 of the opening. The system 300 can include a pin 720 that can be configured to align a tote 325 with a current collector 305 or 405 via placement of the pin 720 in the opening 625 of the receptacle 620.

The battery system 300 can include the length 630 of the opening 625 that provides a first tolerance for alignment of the tote 325 with the current collector 305 or 405 and the width 635 of the opening 625 provides a second tolerance for alignment of the tote 325 with the current collector 305 or 405. The second tolerance can be different from the first tolerance. For example, a length 630 of the opening 625 can be greater than the width 635 of the opening 625. A first tolerance for alignment of the tote 325 with the current collector 305 or 405 can be provided by the length 630 that is greater than a second tolerance for alignment of the tote 325 with the current collector 305 or 405 provided by the width 635. For example, the length 630 of the opening 625 can be less than the width 635 of the opening 625. A first tolerance for alignment of the tote 325 with the current collector 305 or 405 provided by the length 630 can be less than a second tolerance for alignment of the tote 325 with the current collector 305 or 405 provided by the width 635.

In some aspects of the present disclosure, the receptacle 620 and pin 720 can be included in system 300. For example, the system 300 can include a battery module 115, such as an EV 105 comprising a battery pack 110 that can include any number of battery modules 115. The system 300 can include a battery module 115 that can include a current collector 305 or 405 and a tote 325. The system 300 can include a pin 720 that can be located on one of the current collector 305 or 405 or the tote 325. The system 300 can include a receptacle 620 that can be located on one of the current collector 305 or 405 or the tote 325. The receptacle 620 can include an opening 625 that can have a first size 630 in a first direction, such as the length direction 740, that is greater than or equal to a second size 635 of the opening 625 in a second direction, such as the width direction 745. For example, the first direction can be a length direction 740 along which a length size 630 of an elongate elliptical or rectangular opening 625 can be measured along its longest diameter or cross-section. For example, the second direction can be a width direction 745 along which a width size 635 of the elongate elliptical or rectangular opening 625 is measured along its shortest diameter or cross-section. The opening 625 can be configured to align the current collector 305 or 405 with the tote 325 via the pin 720 inserted into the receptacle 620, or into the opening 625 of the receptacle 620.

The battery system 300 can include a second pin 720 that can be located on one of the current collector 305 or 405 or the tote 325. The second receptacle 620 can be located on one of the current collector 305 or 405 or the tote 325. The second receptacle 620 can include a second opening 625 that can have a third size 630 in the first direction (e.g., length direction 740) that is less than or equal to a fourth size 635 of the second opening in the second direction (e.g., width direction 745). The second receptacle 620 can align the current collector 305 or 405 with the tote 325 in the first direction (e.g., length direction 740) and the second direction (e.g., width direction 745) via the second pin 720 inserted into the second receptacle 620.

The battery system 300 can include the opening 625 of the receptacle 620 that comprises the first size (e.g., length size 630) in the first direction (e.g., length direction 740) that is greater than the second size (e.g., width size 635) in the second direction (e.g., width direction 745) to align the current collector 305 or 405 with the tote 325 in the second direction (e.g., width direction 745). The battery system 300 can include a second receptacle 620 that can be located on one of the current collector 305 or 405 or the tote 325. The second receptacle 620 can include a second opening 625 having a third size (e.g., length size 630) in the first direction (e.g., length direction 740) that is less than a fourth size (e.g., width size 65) of the second opening 625 in the second direction (e.g., width direction 745) to align the current collector 305 or 405 with the tote 325 in the first direction (e.g., length direction 740).

The battery system 300 can include the opening 625 of the receptacle 620 that includes the first size (e.g., length size 630) in the first direction (e.g., length direction 740) that is same as the second size (e.g., width size 635) in the second direction (e.g., width direction 745) to align the current collector 305 or 405 with the tote 325 in the first direction (e.g., length direction 740) or the second direction (e.g., width direction 745). The system 300 can include a second receptacle 620 located on one of the current collector 305 or 405 or the tote 325. The second receptacle 620 can include a second opening 625 having a third size (e.g., length size 630) in the first direction (e.g., length direction 740) that is same as a fourth size (e.g., width size 635) of the second opening 625 in the second direction (e.g., width direction 745) to align the current collector 305 or 405 with the tote 325 in the first direction (e.g., length direction 740) and the second direction (e.g., width direction 745).

The battery can include the opening 625 of the receptacle 620 that includes the first size (e.g., length size 630) in the first direction (e.g., length direction 740) that is greater than the second size (e.g., width size 635) in the second direction (e.g., width direction 745) to align the current collector 305 or 405 with the tote 325 in the first direction (e.g., length direction 740) or the second direction (e.g., width direction 745). The battery system 300 can include a second receptacle 620 located on one of the current collector 305 or 405 or the tote 325. The second receptacle 620 includes a second opening 625 having a third size (e.g., length size 630) in the first direction (e.g., length direction 740) that is same as a fourth size (e.g., width size 635) of the second opening 625 in the second direction (e.g., width direction 745) to align the current collector 305 or 405 with the tote 325 in the first direction (e.g., length direction 740) and the second direction (e.g., width direction 745).

The battery can include the opening 625 that includes a shape that is one of elliptical, circular or polygonal and wherein the opening 625 is configured to align the current collector 305 or 405 with the tote 325 in at least the first direction (e.g., length direction 740) and the second direction (e.g., width direction 745). The battery system 300 can include the receptacle 620 that includes the opening 625 of a closed cavity into which at least a portion of the pin 720 is inserted. The battery module 115 can include the receptacle 620 that includes the opening 625 of a through hole through which at least at least a portion of the pin 720 is inserted.

The battery can include one of the pin 720 or the receptacle 20 that is located about a first end 505 of the current collector 305 or 405. For example, the pin 720 or receptacle 620 can be located up to about 25 millimeters from an outer edge, or end, of the current collector 305 or 405. The battery system 300 can include one of a second pin 720 or a second receptacle 620 that can be located about a second end 505 of the current collector 305 or 405. For example, the pin 720 or receptacle 620 can be located up to about 25 millimeters from another outer edge, or end, of the current collector 305 or 405. The second receptacle 620 can include a second opening 625 to align the current collector 305 or 405 with the tote 325 in at least the first direction (e.g., length direction 740) or the second direction (e.g., width direction 745) via the second pin 720 inserted into the second receptacle 620.

The battery system 300 can include the one of the pin 720 or the receptacle 620 that is located about a first corner 510 of a quadrilateral surface of the current collector 305 o 405. For example, the pin 720 or the receptacle 620 can be located in an area of the current collector 305 or 405 that can be formed between about ¼ of a length of a first edge of the current collector 305 or 405 and about ¼ of a length of a second edge of the current collector 305 or 405 that intersects with the first edge to form the first corner 510. The one of a second pin 720 or a second receptacle 620 can be located about a second corner 510 of the surface of the current collector 305 or 405. For example, the pin 720 or the receptacle 620 can be located in an area of the current collector 305 or 405 that can be formed between about ¼ of a length of a first edge of the current collector 305 or 405 and about ¼ of a length of a third edge of the current collector 305 or 405 that intersects with the first edge to form the second corner 510. The second receptacle 620 can include a second opening 625 to align the current collector 305 or 405 with the tote 325 in at least the first direction (e.g., length direction 740) or the second direction (e.g., width direction 745) via the second pin 720 inserted into the second receptacle 620.

The battery system 300 can include the current collector 305 or 405 that can include a tab 705 that can be disposed above a battery cell 120 of the battery module 115. The tab 705 can include a first end (e.g., contact end 1005) and a second end (e.g., connection end 1010). The first end of the tab 705 (e.g., contact end 1005) can be configured to electrically contact the battery cell 120. The second end of the tab 705 (e.g., connection end 1010) can be attached to the current collector 305 or 405, such as for example bar layer 615 of the current collector 305 or 405. The second end (e.g., connection end 1010) can be narrower than the first end (e.g., contact end 1005) to provide strain relief to the tab 705 that can be suspended from the current collector 305 or 405 via the second end (e.g., connection end 1010). The narrower connection end 1010 can make tab 705 more elastic and improve the electrical contact between the contact end 1005 of the tab 705 and the battery cells under stress or strain, which can be caused for example by operating EV 105 on a rugged terrain. 120 For example, a narrower connection end 1010 that is bent downward toward the cells 120 can have added elasticity and flexibility. The added elasticity or flexibility can allow the tabs 705 to maintain the electrical contact between battery cells 120 and the current collector 305 or 405 as tabs 705 can move or adjust under high strain or stress. For example, tab 705 can maintain electrical contact with the battery cells 120 under stress or strain of up to 10 times force of gravity (10G), or up to 20 times force of gravity (20G), or up to 25 times force of gravity (25G). Using the tabs 705 the battery module 115 can resist shocks of up to 25G as the EV 105 operates over rugged and difficult terrain.

The battery system 300 can include the current collector 305 or 405 that includes a layer of material (e.g., cover layer 605) above the tab 705. The layer of material (e.g., cover layer 605) can include a cutout 710 that can expose the first end of the tab 705 (e.g., contact end 1005) and at least partially obstruct a portion of the second end of the tab 705 (e.g., connection end 1010). The cutout 710 can expose openings on both sides the second end (e.g., connection end 1010) to allow for locating of the battery cell 120 beneath the tab 705 through the cutout 710 in the layer of material (e.g., cover layer 605) of the current collector 305 or 405. For example, the visibility provided by the cutout 710 exposing openings on either side (e.g. left side and right side) of the tab 705 can allow for visual locating of rims of the cells 120 beneath the tab 705. For example, the cutout 710 in the cover layer 605 can be located above and around the tab 705, so as to allow for a top-down view of the tab 705, and areas to the left and to the right of the connection end 1010 of the tab 705, so as to allow for viewing of one or more battery cells 120 in the tote 325, beneath the tab 705.

The battery system 300 can include a first sheet (e.g., bar layer 615) of the current collector 305 or 405. The first sheet (e.g., bar layer 615) can include one or more electric conductors, such as a sheet of copper, aluminum or any other electrical conductor. A second sheet (e.g., contact layer 610) of the current collector 305 or 405 can be on top of the first sheet (e.g., bar layer 615). The second sheet (e.g., contact layer 610) can include one or more electric conductors, such as for example, a sheet of copper, aluminum or any other electrical conductor. The second sheet (e.g., contact layer 610) can be thinner than the first sheet (e.g., bar layer 615) and can be in electrical contact with the first sheet (e.g., bar layer 615). For example, the bar layer 615 and the contact layer 610 can be welded, soldered, or otherwise physically and electrically coupled together. A tab 705 of the current collector 305 or 405 can include a first end (e.g., contact end 1005) to electrically contact a battery cell 120 of the battery system 300 and a second end (e.g., connection end 1010) via which the tab 705 is attached to and suspended from the second sheet (e.g., contact layer 610) of the current collector 305 or 405.

The battery system 300 can include current collector 305 or 405 including a layer of material (e.g., cover layer 605) that can be disposed above the first sheet (e.g., bar layer 615) and the second sheet (e.g., contact layer 610). The layer of material (e.g., cover layer 605) can include one or more weld windows 715 to weld, such as via welds 730, the first sheet (e.g., bar layer 615) to the second sheet (e.g., contact layer 610) through the one or more weld windows 715 of the layer of material (e.g., cover layer 605). Weld windows 715 can be patterned across the current collector 305 or 405 so as to be distributed in rows or columns across the current collectors 305 or 405. Weld windows 715 can include one or more laser weld windows for laser welding one or more layers of the current collectors 305 or 405. For example, bar layer 615 and contact layer 610 can be laser welded with each other through weld windows 715 that are patterned across multiple rows and columns over the current collectors 305 or 405.

In some aspects the present disclosure relates to an electric vehicle 105. The electric vehicle 105 can include a battery system 300. The battery system 300 can include one or more battery packs 110, one or more battery modules 115, one or more battery cells 120, or any combination thereof. The battery system 300 can include a receptacle having an opening 625. A length 630 of the opening 625 can be different from a width 635 of the opening 625. The battery system 300 can include a pin 720 that can be configured to align a tote 325 with a current collector 305 or 405 via placement of the pin 720 in the opening 625 of the receptacle 620. The electric vehicle 105 can include the length 630 of the opening 625 that provides a first tolerance for alignment of the tote 325 with the current collector 305 or 405 and the width of the opening 625 provides a second tolerance for alignment of the tote 325 with the current collector 305 or 405. The second tolerance can be different from the first tolerance.

Figure 12:
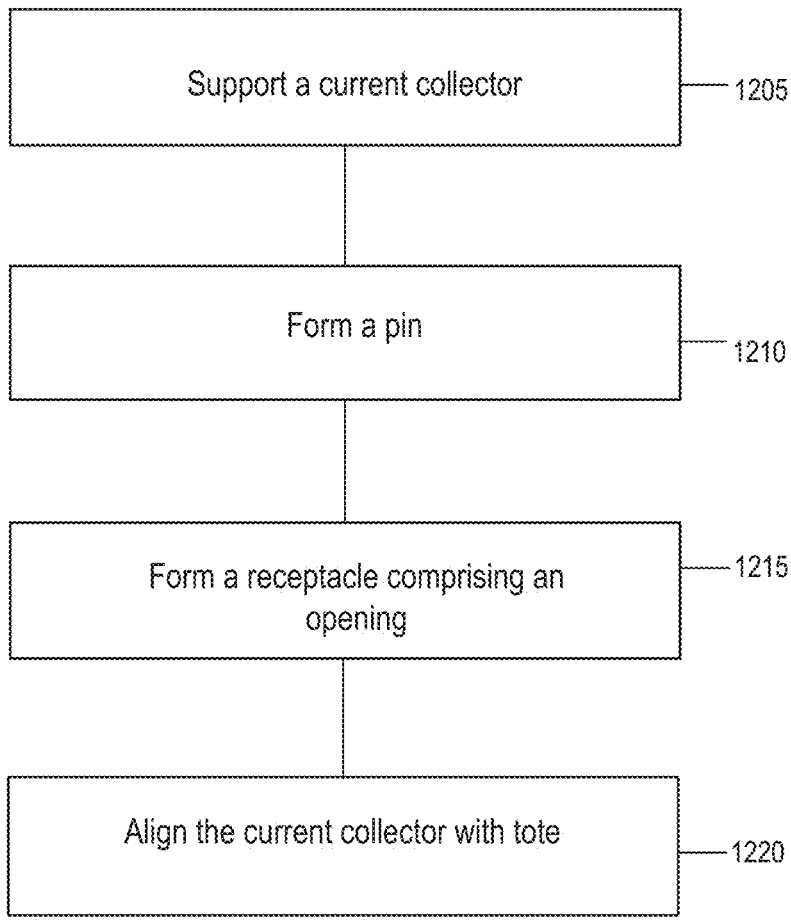
FIG. 12 is a flow diagram illustrating an example method of aligning a current collector with a tote of a battery module.

FIG. 12 depicts a method 1200 to align a current collector to a tote of a battery module. The method can also provide access for alignment of current collector tabs with battery cells in the battery module and weld windows for internal welding of layers or sheets of the current collector. The method 1200 can be performed by, using, or for a system 300, a battery system 300, a battery pack 110 or an EV 105. The method 1200 can include supporting a current collector at ACT 1205. At ACT 1210, the method 1200 can include forming a pin. At ACT 1215, the method 1200 can include forming a receptacle comprising an opening. At act 1220, the method 1200 can include aligning the current collector with the tote.

At ACT 1205, the method 1200 can include supporting a current collector. The method can include supporting a current collector of a battery module by a tote of the battery module. The method can include providing a battery system. The battery system can include a receptacle having an opening. A length of the opening can be different from a width of the opening. The battery system can include a pin. The pin can be configured to align a tote with a current collector via placement of the pin in the opening of the receptacle. The method can include forming a layer of material above of the tab that is above the battery cell. The method can include forming a cutout in the layer of material exposing the first end of the tab and at least partially obstructing a portion of the second end of the tab. The cutout can expose openings on both sides the second end to allow for locating of the battery cell through the layer of material beneath the tab. The method can include forming a first sheet of the current collector, such as a layer of the current collector. The first sheet (e.g., the first layer) can include one or more electric conductors. The method can include forming a second sheet of the current collector on top of the first sheet. The second sheet (e.g., the second layer of the current collector) can include the one or more electric conductors. The second sheet can be thinner than the first sheet and in electrical contact with the first sheet. The method can further include electrically connecting a battery cell of the battery module with the current collector via a tab of the current collector. The tab can include a first end to electrically connect to the battery cell and a second end via which the tab is attached to and suspended from the second sheet of the current collector. The current collector can include a layer of material above the first sheet and the second sheet. The layer of material can include one or more weld windows to weld the first sheet to the second sheet through the one or more weld windows of the layer of material. At ACT 1210, the method 1200 can include forming a pin. The method can include forming a pin on one of the current collector or the tote. For example, a pin can be formed on an outer surface of a current collector that interfaces with the tote of the battery module. For example, a pin can be formed on an outer surface of the tote that interfaces with the current collector. The pin can include a projection from a surface for interfacing with and aligning of the current collector and the tote. The pin can include a post, a column, a bump, a cylinder, a sphere or a semi-sphere. The method can include forming a second pin located on one of the current collector or the tote. The method can include forming any number of pins on the current collector or the tote. For example, the current collector or the tote can include four pins formed in four corners of either the tote or the current collector. For example, the current collector or the tote can include a pin formed on each of the two opposing ends of a surface of the tote or the current collector.

At ACT 1215, the method 1200 can include forming a receptacle comprising an opening. The method can include forming, on one of the current collector or the tote, a receptacle comprising an opening. The opening can have a first size in a first direction that is greater than or equal to a second size of the opening in a second direction. The first direction and the second direction can be orthogonal or perpendicular to each other. The opening can have a first size in a first direction that is less than a second size of the opening in a second direction. The opening can have a first size in the first direction that is the same as the second size of the opening in the second direction. For example, the opening can include a circular shape (e.g., first size and second size are the same), an elliptical shape or a rectangular shape (e.g., first size and second size are not equal), or any other shape, such as a triangle, square or a polygon. The opening can be an opening of a closed or an open cavity into which pin can be inserted. The method can include forming, on one of the current collector or the tote, a second receptacle. The second receptacle can be the same as the first receptacle or can be different from the first receptacle. The second receptacle can include a second opening that can have a third size in the first direction that is less than or equal to a fourth size of the second opening in the second direction. The third size in the first direction can be greater than the fourth size in the second direction.

The method can include providing the battery system having the length of the opening that provides a first tolerance for alignment of the tote with the current collector and the width of the opening that provides a second tolerance for alignment of the tote with the current collector. The second tolerance can be different from the first tolerance. The length of the opening can be greater than the width of the opening. A first tolerance for alignment of the tote with the current collector provided by the length can be greater than a second tolerance for alignment of the tote with the current collector provided by the width. The length of the opening can be less than the width of the opening. A first tolerance for alignment of the tote with the current collector provided by the length can be less than a second tolerance for alignment of the tote with the current collector provided by the width.

At ACT 1220, the method 1200 can include aligning the current collector with the tote. The method can include aligning the current collector with the tote in at least the first direction or the second direction via the pin inserted into the receptacle. The method can include aligning the current collector with the tote in the first direction and the second direction via the second pin inserted into the second receptacle. The method can include electrically connecting, via a first end of a tab of a current collector, a battery cell of the battery module with a current collector. The method can include attaching, by a second end of the tab, to the current collector in a suspended fashion, the second end narrower than the first end to provide strain relief to the tab.

Figure 13:
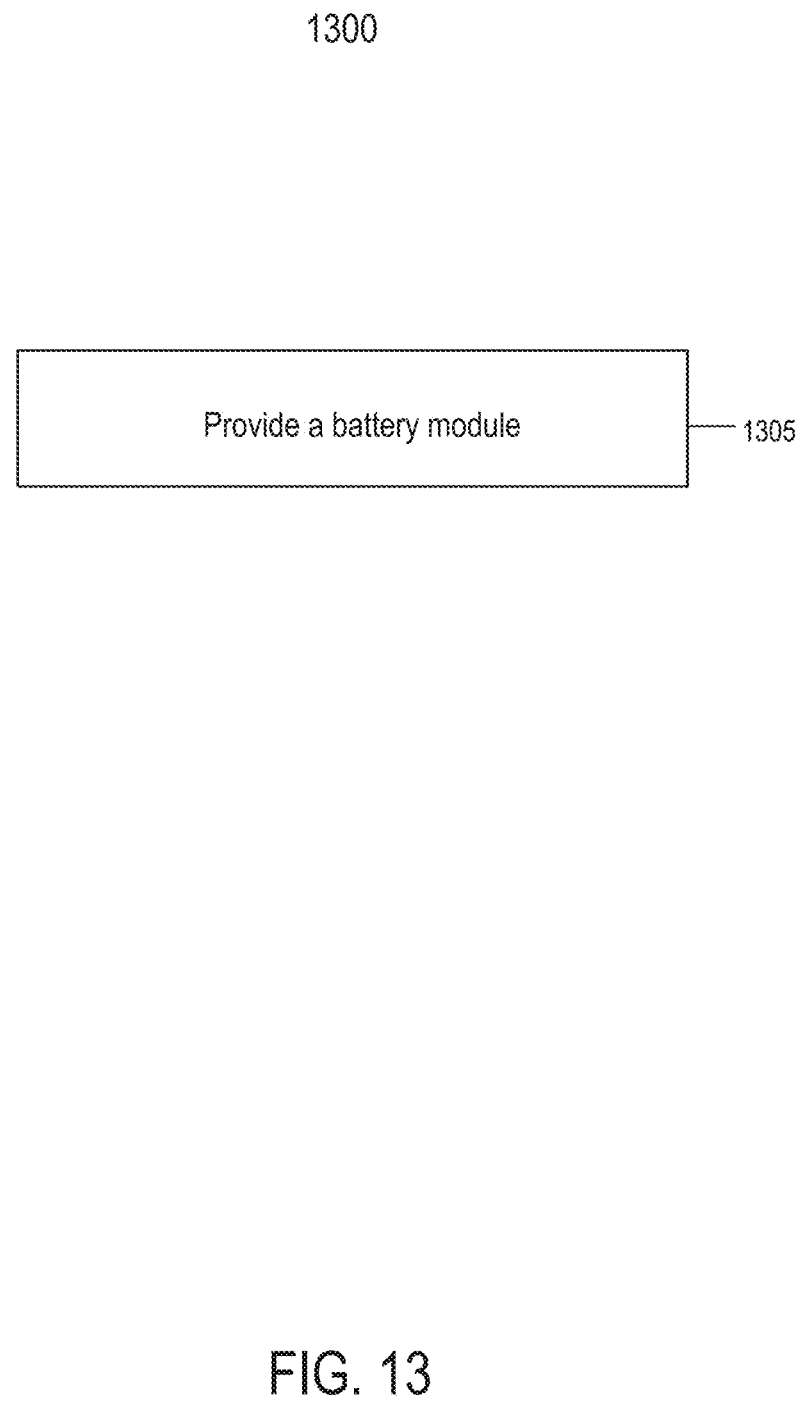

FIG. 13 depicts a method 1300 for providing a battery module. The method 1300 can include providing a battery module at ACT 1305. The method can include providing a battery module that can include a current collector of the battery module and a tote of the battery module to provide support for the current collector. The battery module can include a pin located on one of the current collector or the tote. The method can include a receptacle located on one of the current collector or the tote. The receptacle that can include an opening having a first size in a first direction that is greater than or equal to a second size of the opening in a second direction to align the current collector with the tote in at least the first direction or the second direction via the pin inserted into the receptacle. The battery system can include a receptacle having an opening whose length of the opening can be different from a width of the opening. The battery system can include a pin that can be configured to align a tote with a current collector via placement of the pin in the opening of the receptacle.

This present application is related to a co-pending application titled "Interface for a Current Collector and a Busbar in a Battery" filed concurrently with the present application and corresponds to U.S. patent application Ser. No. 18/067,771 which was filed Dec. 19, 2022 and a co-pending application titled "Busbar Integrated with a Tote of a Battery Assembly" filed concurrently with the present application and corresponds to U.S. patent application Ser. No. 18/067,768 which was filed Dec. 19, 2022, both of which are incorporated by reference herewith in their entirety and for all purposes.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. For example, negative busbar and a positive busbar can be reversed, as well as negative current collector and the positive current collector. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A battery system, comprising:
   a receptacle having an opening, wherein a length of the opening is different from a width of the opening;
   a pin configured to align a tote with a current collector via placement of the pin in the opening of the receptacle;
   a first sheet of the current collector, the first sheet comprising one or more electric conductors;
   a second sheet of the current collector on top of the first sheet, the second sheet comprising the one or more electric conductors, the second sheet thinner than the first sheet and in electrical contact with the first sheet; and
   a tab of the current collector comprising a first end to electrically connect to a battery cell and a second end via which the tab is attached to and suspended from the second sheet of the current collector.

2. The battery system of claim 1, wherein the length of the opening provides a first tolerance for alignment of the tote with the current collector, and the width of the opening provides a second tolerance for alignment of the tote with the current collector, the second tolerance is different from the first tolerance.

3. The battery system of claim 1, wherein the length of the opening is greater than the width of the opening, and a first tolerance for alignment of the tote with the current collector provided by the length is greater than a second tolerance for alignment of the tote with the current collector provided by the width.

4. The battery system of claim 1, wherein the length of the opening is less than the width of the opening, and a first tolerance for alignment of the tote with the current collector provided by the length is less than a second tolerance for alignment of the tote with the current collector provided by the width.

5. The battery system of claim 1, comprising:
   a second receptacle having a second opening, wherein a second length of the second opening is different from a second width of the second opening; and
   a second pin configured to align the tote with the current collector via placement of the second pin in the second opening of the second receptacle.

6. The battery system of claim 1, comprising:

a second receptacle having a second opening, wherein a second length of the second opening is different from a second width of the second opening, and the second length is different from the length of the opening; and a second pin configured to align the tote with the current collector via placement of the second pin in the second opening of the second receptacle.

7. The battery system of claim 1, comprising:

a second receptacle having a second opening, wherein a second length of the second opening is different from a second width of the second opening, and the second length is equal to the width of the opening; and a second pin configured to align the tote with the current collector via placement of the second pin in the second opening of the second receptacle.

8. The battery system of claim 1, comprising:

the receptacle located on the tote; and the pin located on the current collector.

9. The battery system of claim 1, comprising:

the receptacle located on the current collector; and the pin located on the tote.

10. The battery system of claim 1, comprising:

the second end narrower than the first end to provide strain relief to the tab suspended from the current collector via the second end.

11. The battery system of claim 10, comprising:

the current collector comprising a layer of material above the tab and the battery cell, wherein the layer of material comprises a cutout that exposes the first end of the tab and at least partially obstructs a portion of the second end of the tab, wherein the cutout exposes openings on the second end to locate the battery cell through the layer of material beneath the tab.

12. The battery system of claim 1, comprising:

the current collector comprising a layer of material above the first sheet and the second sheet, wherein the layer of material comprises one or more weld windows to weld the first sheet to the second sheet through the one or more weld windows of the layer of material.

13. A method, comprising:

providing a receptacle of a battery system;

providing an opening defined by the receptacle;

providing a length of the opening that is different from a width of the opening;

providing a pin configured to align a tote of the battery system with a current collector of the battery system via placement of the pin in the opening of the receptacle;

a first sheet of the current collector comprising one or more electric conductors;

a second sheet of the current collector on top of the first sheet, the second sheet comprising the one or more electric conductors, the second sheet thinner than the first sheet, and the second sheet in electrical contact with the first sheet; and a tab of the current collector comprising a first end to electrically connect to a battery cell and a second end via which the tab is attached to and suspended from the second sheet of the current collector.

14. The method of claim 13, comprising:

providing a first tolerance of the length of the opening for alignment of the tote with the current collector; and providing a second tolerance of the width of the opening for alignment of the tote with the current collector, the second tolerance different from the first tolerance.

15. The method of claim 13, wherein the length of the opening is greater than the width of the opening, and a first tolerance for alignment of the tote with the current collector provided by the length is greater than a second tolerance for alignment of the tote with the current collector provided by the width.

16. The method of claim 13, wherein the length of the opening is less than the width of the opening, and a first tolerance for alignment of the tote with the current collector provided by the length is less than a second tolerance for alignment of the tote with the current collector provided by the width.

17. The method of claim 13, comprising:

providing the battery system comprising a second receptacle having a second opening, wherein a second length of the second opening is different from a second width of the second opening; and providing the battery system comprising a second pin configured to align the tote with the current collector via placement of the second pin in the second opening of the second receptacle.

18. An electric vehicle, comprising:

a battery system, comprising:

a receptacle having an opening, wherein a length of the opening is different from a width of the opening;

a pin configured to align a tote with a current collector via placement of the pin in the opening of the receptacle;

a first sheet of the current collector, the first sheet comprising one or more electric conductors;

a second sheet of the current collector on top of the first sheet, the second sheet comprising the one or more electric conductors, the second sheet thinner than the first sheet and in electrical contact with the first sheet; and a tab of the current collector comprising a first end to electrically connect to a battery cell and a second end via which the tab is attached to and suspended from the second sheet of the current collector.

19. The electric vehicle of claim 18, wherein the length of the opening provides a first tolerance for alignment of the tote with the current collector, and the width of the opening provides a second tolerance for alignment of the tote with the current collector, the second tolerance different from the first tolerance.

20. The electric vehicle of claim 18, comprising:

the current collector comprising a layer of material above the first sheet and the second sheet, wherein the layer of material comprises one or more weld windows to weld the first sheet to the second sheet through the one or more weld windows of the layer of material.

* * * * *